United States Patent [19]
Hoffken

[11] Patent Number: 5,601,343
[45] Date of Patent: Feb. 11, 1997

[54] UNITARY WHEEL SYSTEM FOR ROAD VEHICLES

[76] Inventor: Rudiger Hoffken, Alte Handelstrasse 14a, 57439 Attendorn, Germany

[21] Appl. No.: 298,776

[22] Filed: Aug. 31, 1994

[51] Int. Cl.[6] .................................................. B60B 27/00
[52] U.S. Cl. .................................. 301/35.63; 301/111
[58] Field of Search .................... 301/35.54, 35.55, 301/35.57, 35.58, 35.62, 35.63, 111, 114, 105.1

[56] References Cited

U.S. PATENT DOCUMENTS

| | | | |
|---|---|---|---|
| 1,442,944 | 1/1923 | Harvey | 301/35.62 |
| 1,846,079 | 2/1932 | Bellamore | 301/35.63 X |
| 2,516,896 | 8/1950 | Manning | 301/35.62 X |
| 2,969,256 | 1/1961 | Harberts | 301/35.62 |
| 4,299,425 | 11/1981 | Renz et al. | 301/35.58 X |
| 4,537,449 | 8/1985 | Hayashi | 301/35.63 |
| 5,454,628 | 10/1995 | Maiworm et al. | 301/35.62 X |

FOREIGN PATENT DOCUMENTS

| | | |
|---|---|---|
| 0553696 | 8/1993 | European Pat. Off. . |
| 808064 | 1/1937 | France .................. 301/35.63 |
| 1504385 | 12/1967 | France .................. 301/35.63 |
| 2903229 | 7/1980 | Germany . |
| 8809581.9 | 1/1989 | Germany . |
| 9005110.6 | 10/1991 | Germany . |
| 4023912 | 1/1992 | Germany . |
| 118502 | 7/1984 | Japan .................. 301/35.63 |
| 2264089 | 8/1993 | United Kingdom . |

*Primary Examiner*—Russell D. Stormer
*Attorney, Agent, or Firm*—Gifford, Krass, Groh, Sprinkle, Patmore, Anderson & Citkowski, P.C.

[57] ABSTRACT

The invention concerns a unitary wheel system for road vehicles, especially cars, in order to minimize the manufacturing costs and the expenses for piling up reserves concerning such wheels the proposed wheel system is based on a single wheel provided with less additional elements to adapt this wheel to practically each car requesting wheels having a hole circuit diameter between 98 and 120 mm independently from the fact whether the attachment of the wheel to the axle hub of the vehicle should be made by means of four or five holes and a corresponding number of screws and further independently from the fact whether or not the wheel or its rim, respectively, is to be attached by wheel screws or by a central closing nut.

7 Claims, 24 Drawing Sheets

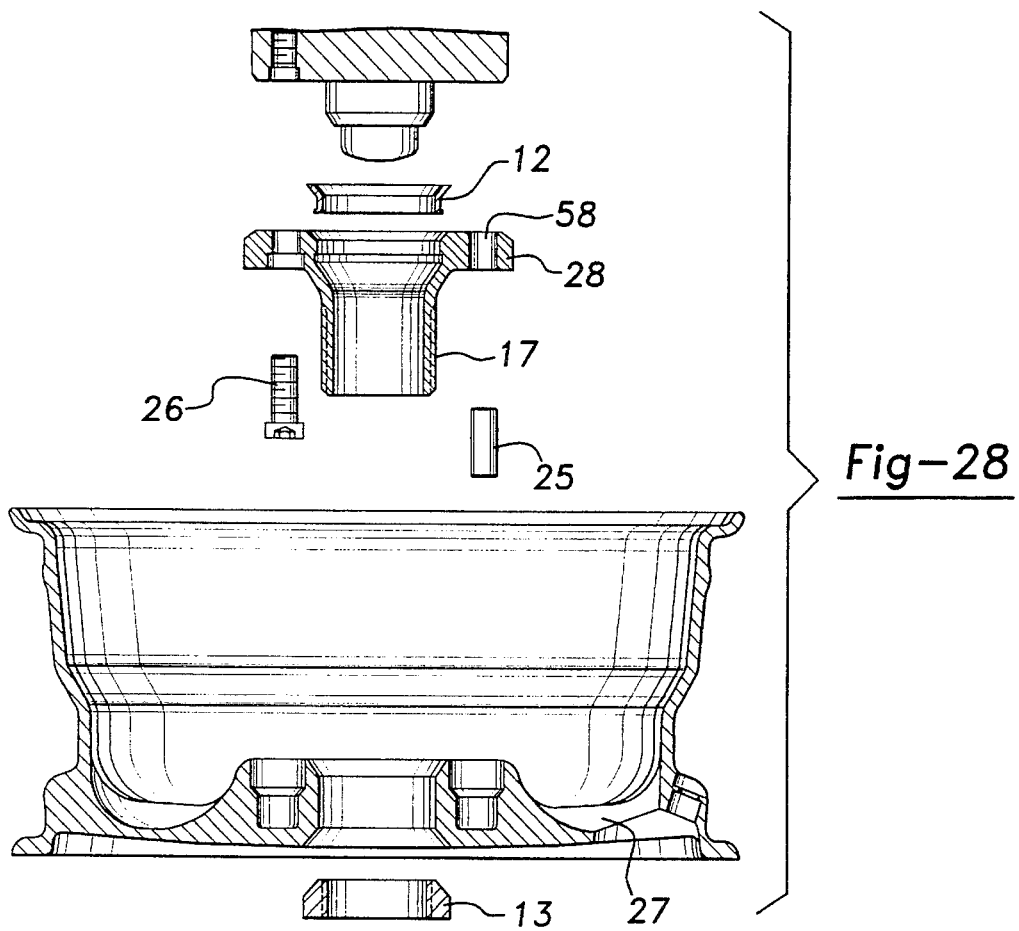
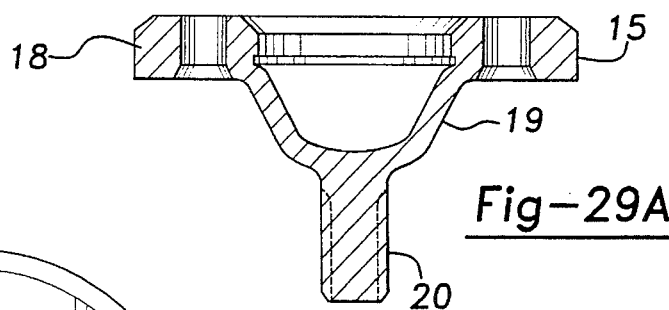
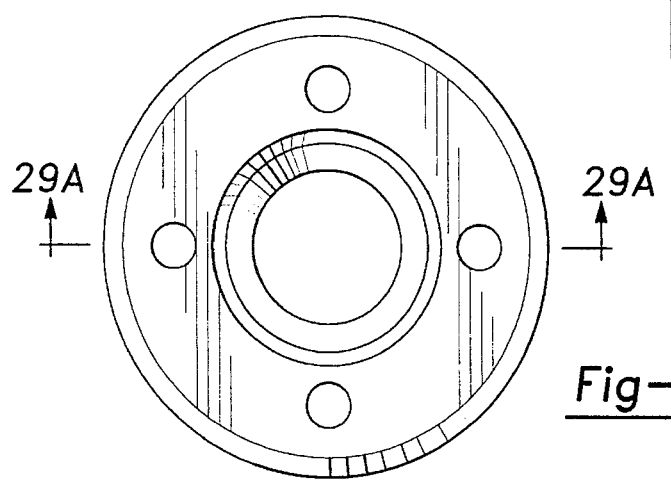

UNITARY WHEEL SYSTEM FOR ROAD VEHICLES

BACKGROUND OF THE INVENTION

The invention relates to a unitary wheel system for road vehicles, especially cars, comprising a wheel rim especially manufactured of aluminum, a hub adapter which can be applied to the hub of the vehicle axis or brake disc or brake drum, respectively, by means of screws and further comprising a centric, cylindrical portion extending through the wheel rim and provided with a thread as well as with a centric bore at least open in the direction to the hub of the vehicle axis.

Nowadays the manufacturers of wheels for cars are world-wide forced to manufacture a multiplicity of wheels and to take them in stock, which wheels differ broadly with respect to the rim sizes, especially its diameter and width, in order to satisfy multiple wishes of buyers and to fulfil technical requirements. Thus, the costs for manufacturing and especially those for wheels of aluminum which are increasingly requested because of weight saving reasons, as well as the costs for retaining those wheels in stores are substantial and increase accordingly the price of the car.

A unitary wheel system as generally described above is known from Gertran patent No. 40 23 912. Although that unitary wheel system describes the use of different adapters, one cannot derive from that disclosure that one and the same wheel rim can be fixed to wheel hubs having different diameters of hole circle or wheel hub diameters, respectively. A unitary wheel system according to the general teaching of the subject invention is also known from German utility model No. 90 05 110. According to that known unitary wheel system the wheel rim can be connected by means of a connecting part as well as an exchangeable adapter part the wheel hub.

SUMMARY OF THE PRESENT INVENTION

It is therefore an object of the invention to improve the unitary wheel system of the above mentioned kind such that it is based on only one basic wheel of especially aluminum which can be used together with a few additional elements for practically each car independently of the fact that this wheel is to be connected by 4 screws and is therefore provided with 4 holes or by 5 screws and is therefore provided with 5 holes.

It is a further object of the invention to develop the above mentioned unitary wheel system such that it is especially advantageous to be used for wheels having a diameter of their hole circuits between 89 and 120 mm.

It is still a further object to provide such a unitary wheel system according to which the wheels may be screwed to the hub of the vehicle axis or brake disc or brake drum, respectively, by wheel screws or by a central closing screw nut. Finally it is a further object to develop such a unitary wheel system the single parts of which are suitable for use in a multiplicity of mounting conditions for the manufacture of a specifically requested wheel.

These and other objects of the invention are solved by a construction according to which only one wheel rim is provided for a great number of different cars together with a hub adapter which can be connected to the hub of the vehicle axis or brake disc or brake drum, respectively, by means of screws and further together with a centric, cylindrical part extending through the wheel rim comprising a thread as well as a centric bore open at least to the hub of the vehicle axis. That wheel rim can be fixed to the hub adapter by a central closing screw nut co-operating with the thread of the hub adapter as well as by several centering elements, whereas fixing of the wheel rim in such a way means simultaneously fixing it to the hub of the vehicle axis or brake disc or brake drum, respectively. Moreover, the rear side of the wheel rim adjacent to the hub of the vehicle axis is provided with several centrically positioned holes each of which can receive the one end of the mentioned centering elements. The construction being such that the holes which are provided in the wheel rim are configured as holes provided with an elongated outline, called slots and that there is a distance ring by which the space between the circumference of the axle hub and the central bore of the hub adapter can be filled.

Thus, the basic idea underlying the invention is to manufacture "similar wheels" which can be used for different cars by means of spacing pieces, the construction being such that generally said only one type per diameter and width must be manufactured having always the same sizes. The adaptation to the screw joint of the different hubs of the axis of the several types of cars under consideration of suited tracks can be reached by changements of sizes and by using a suited flange thickness of the hub adapters.

According to a favourable embodiment of the invention the rear side of the wheel rim adjacent to the vehicle hub may be provided with 4 centrically positioned holes for the reception of 4 centering screws or 4 stand bolts and centering nuts for thus corresponding to a 4-hole equipment or may be provided with 5 of such centrically positioned holes corresponding to a 5-hole equipment.

According to a further embodiment of the subject invention it is possible to provide the rear side of the wheel rim adjacent to hub of the vehicle axis as well as with 4 and 5 centrically positioned holes located on the same hole circuit and suited for the reception of centering screws or stand bolts, respectively, provided with centering nuts for the connection of the hub adapter to the hub of the vehicle axis.

The cylindrical part of the hub adapter extending through the wheel rim is according to an especially advantageous embodiment of the subject invention a hollow cylinder onto which the central closing nut can be screwed. The rear end of this hollow cylinder is conically extended in order to enclose the axle-grease cap of the hub of the vehicle axis and is provided with a connecting flange and the front end of said hollow cylinder is provided an outer diameter corresponding generally to the inside diameter of the centric borehole of the wheel rim through which the hub adapter extends.

In case a central closing screw nut is used the cylindrical part of the hub adapter extending through the wheel rim may also be configured such that it is converging conically in the direction of its front end so that on this converging tap provided with an external thread the central closing screw nut may be screwed sitting on a disc positioned in an aperture of the borehole of the wheel rim such that the front taplike, conically converging end is provided in the direction of the back end of the hub adapter with an expanding conus enclosing the axle-grease cap and carrying a connecting flange.

In order to centering the hub adapter with respect to the middle of the wheel rim with respect to the hub of the vehicle axis or brake disc or brake drum, respectively, it has been found especially advantageous to arrange between the hub of the vehicle axis and the hub adapter a distance ring. By means of variable inside diameters of that distance ring such an adaptation to different diameters of the axle tap of the several types of vehicles may be gained. The seats of the distance ring within the hub adapters are always provided with the same dimensions so that the adaptation to changing hub diameters of the vehicle axis may be made by using corresponding wall thicknesses of these distance rings.

An alternative solution of the objects underlying the invention is characterized by a wheel rim consisting especially of aluminum, provided with a hub adapter by which the wheel rim is fixed to the hub of the vehicle axis or the brake disc or brake drum, respectively, by means of centering elements and at least two wheel screws. In such a case the connection of the wheel needs no central closing screw nut but the usual wheel screws extending from outside through the rim. In this connection it has been found especially advantageous to use as a centering element at least one centering screw extending through the hub adapter and being able to be screwed into the hub of the vehicle axis, the head of that screw being located within a blind hole on the rear side of the wheel rim adjacent to the hub of the vehicle axis.

A further advantageous embodiment of the invention is characterized by the fact that the hub adapter can be inserted from the front side of the wheel rim into the centric aperture of the wheel rim and can be fixed therein by a fit pin as centering element so that the adapter will be positioned by means of two wheel screws extending through openings within the hub adapter in order to fix the wheel rim to the hub of the vehicle axis. For that purpose the hub adapter may be provided on its front with a flange which is insertable into a corresponding recess of the hub of the wheel rim.

Corresponding to the advantageous embodiment of the present invention concerning the first above mentioned solution of the several objects in the last mentioned case the wheel rim may be provided on its front side with 5 passage holes for wheel screws and on its rear side with 5 blind holes for centering screws.

It has been found advantageous as well to provide the hub adapter with 5 centrically positioned passage holes for the reception of wheel screws as well as with 5 centrically positioned passage holes for the reception of fit pins.

Furthermore, the above mentioned construction concerning the alternative solution of the object underlying the invention requesting centering of the hub adapter uses a distance ring, too, the outer diameter of which remains constant for different mounting cases and the inner diameter which, however, varies for adaptation to different diameters of axle pivots. These distance rings may be manufactured of a plastic material or metal.

DESCRIPTION OF THE DRAWINGS

A better understanding of the invention will be reached by reference to the following detailed description when read in conjunction with the accompanying drawings in which are FIG. 1 and FIG. 2 a sectional view and a plan view, respectively, of a unitary wheel rim provided with 4 holes, FIG. 3 and FIG. 4 a sectional view and a plan view, respectively, of a unitary wheel rim provided with 5 holes, FIG. 5 and FIG. 6 a sectional view and a plan view, respectively, of a unitary wheel rim provided with a combination of 4 holes and 5 holes, FIG. 7 a sectional view and a plan view, respectively, of a hub adapter provided with 4 holes and a central closing screw nut, FIG. 8 a sectional view and a plan view, respectively, of a hub adapter provided with 5 holes on each of two peripheral circuits and a central closing screw nuts, FIG. 9 a sectional view and a plan view, respectively, of a hub adapter provided with 5 holes and a central closing screw nut, FIG. 10 and FIG. 11 a sectional view and a plan view, respectively, of a mounting configuration of a unitary wheel provided with 4 holes and a central closing screw nut, FIG. 12 and FIG. 13 a sectional view and a plan view, respectively, of a mounting configuration of a unitary wheel provided with 5 holes and a central closing screw nut, FIG. 14 and FIG. 15 a sectional view and a plan view, respectively, of a mounting configuration of a unitary wheel provided with 4 holes centering screws as well as a central closing screw nut, FIG. 16 and FIG. 17 a sectional view and a plan view, respectively, of a mounting configuration of a unitary wheel provided with a combination of 4 and 5 holes and a central closing screw nut, wherein the 5 holes are used together with centering nuts, FIG. 18 an explosion view of a unitary wheel of the type shown in FIG. 16 and 17, FIG. 19 a sectional view of a mounting configuration of a unitary wheel provided with central closing screw nut and centering screws, FIG. 20 an explosion view of a unitary wheel provided with a central closing screw nut and centering nuts, FIG. 21 a sectional view of a mounting configuration of a unitary wheel provided with a central closing screw nut and centering nuts, FIG. 22 a front view of a unitary wheel provided with a first embodiment the central closure, FIG. 23 a front view of a unitary wheel provided with a second embodiment of the central closure, FIG. 24 and FIG. 25 a sectional view and a plan view, respectively, of a mounting configuration of a unitary wheel provided with the combination of 4 and 5 holes together with a central closing screw nut and machine screws as well as centering fit pins in ease of using 4 holes, FIG. 26 and FIG. 27 a sectional view and a plan view, respectively, of a mounting configuration of a unitary wheel provided with the combination of 4 and 5 holes together with a central closing screw nut and machine screws as well as centering fit pins in case of using 5 holes, FIG. 28 a sectional explosion view of the unitary wheel provided with a central closing screw nut, machine screws and centering fit pins, FIG. 29 a sectional view and a plan view, respectively, of a hub adapter provided with 4 holes for a central closing screw nut, FIG. 30 a sectional view and plan view, respectively, of a hub adapter provided with 4 holes and 4 fit pin holes for a central closing screw nut, FIG. 31 a sectional view of a mounting configuration of the unitary wheel provided with a central closing screw nut and centering nuts, FIG. 32 and FIG. 33 a sectional view of a mounting configuration and a plan view, respectively, of the unitary wheel provided with the combination of 4 and 5 holes with a central closing screw nut and centering nuts on using the 4 hole equipment, FIG. 34 and FIG. 35 a sectional view of a mounting configuration and a plan view, respectively, of the unitary wheel provided with the combination of 4 and 5 holes with a central closing screw nut and centering nuts on using the 5 hole equipment, FIG. 36 a sectional explosion view of a unitary wheel provided with the central closing screw nut and centering nuts, FIG. 37 and FIG. 38 a sectional view and a plan view, respectively, of a hub adapter without a central closing screw nut provided with 4 holes, FIG. 39 and FIG. 40 a sectional view of a mounting configuration and a plan view, respectively, of a unitary wheel provided using 5 holes with a hub adapter without a central closing screw nut, but with centering screws and wheel screws, FIG. 41 a sectional explosion view of a unitary wheel provided with a hub adapter without central closing screw, but having centering screws and wheel screws, FIG. 42 a front view of a unitary wheel provided with a hub adapter without a central closing screw nut, but with wheel screws, FIG. 43 and FIG. 44 a sectional view and a plan view, respectively, of a hub adapter for the use of fit pins and wheel screws, FIG. 45 and FIG. 46 a sectional view of a mounting configuration and a plan view, respectively, of a unitary wheel provided with a hub adapter of FIG. 43 and FIG. 44 and 5 holes and FIG. 47 a sectional explosion view of a unitary wheel provided with the hub adapter of FIG. 43 and FIG. 44 as well as a fit pin and wheel screws.

Figure 7A:
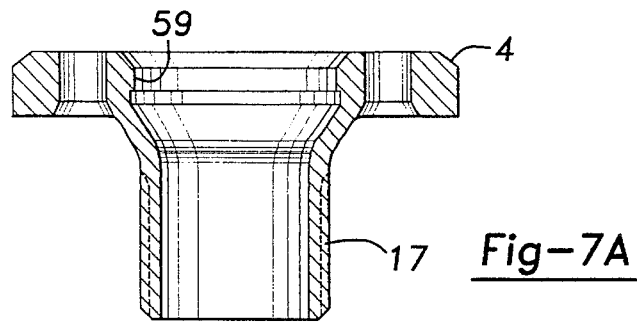
Figure 7B:
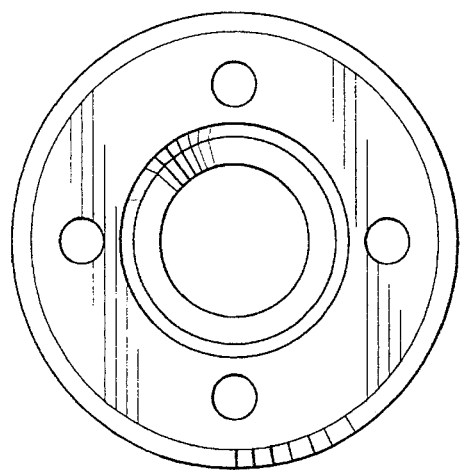
Figure 10:
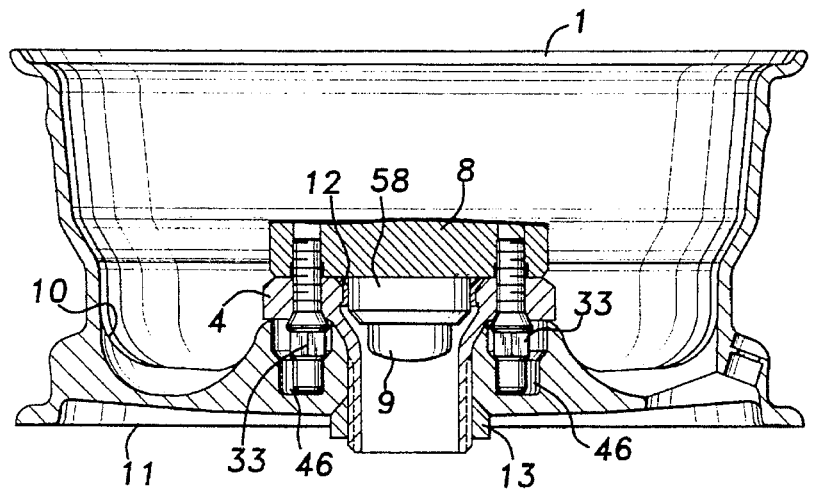
Figure 11:
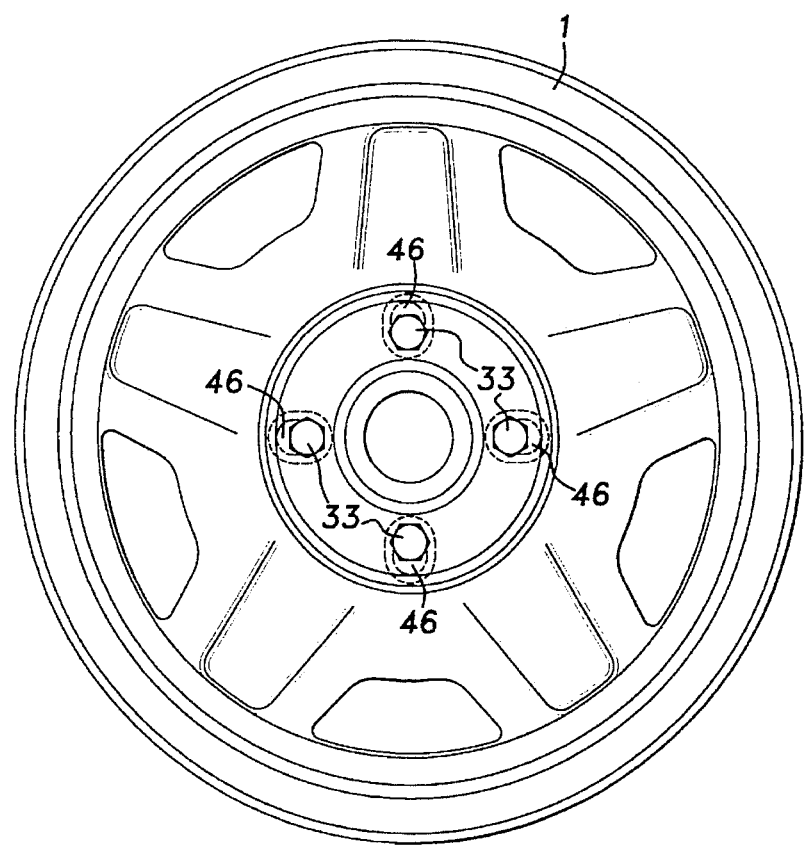
Figure 12:
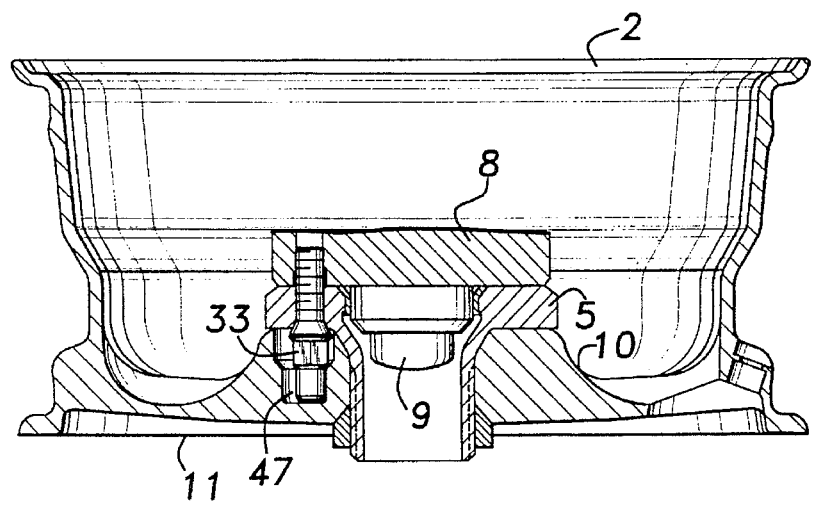
Figure 13:
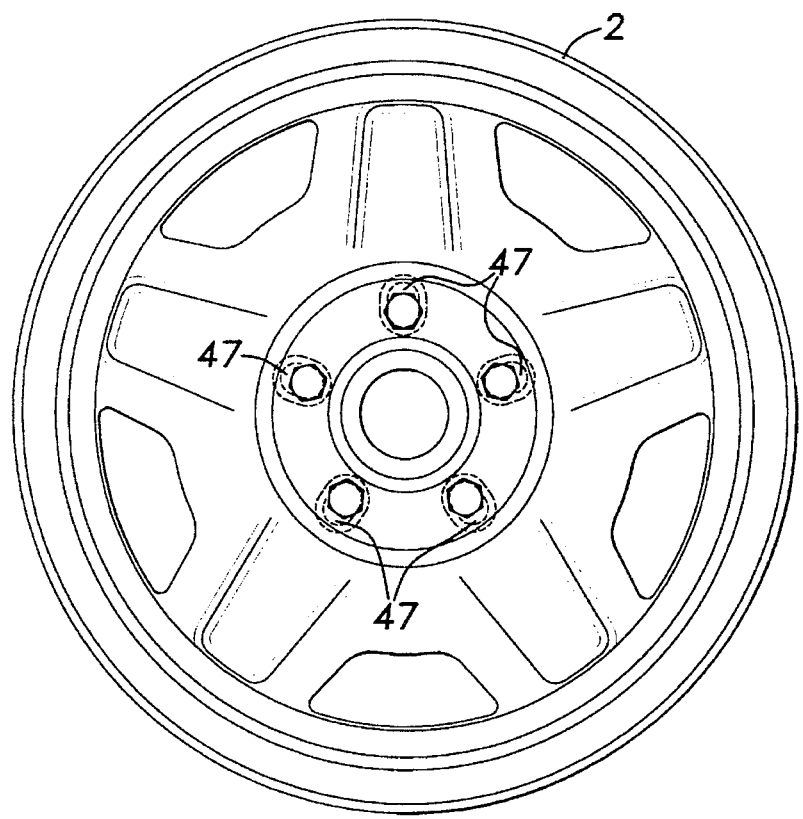
Figure 14:
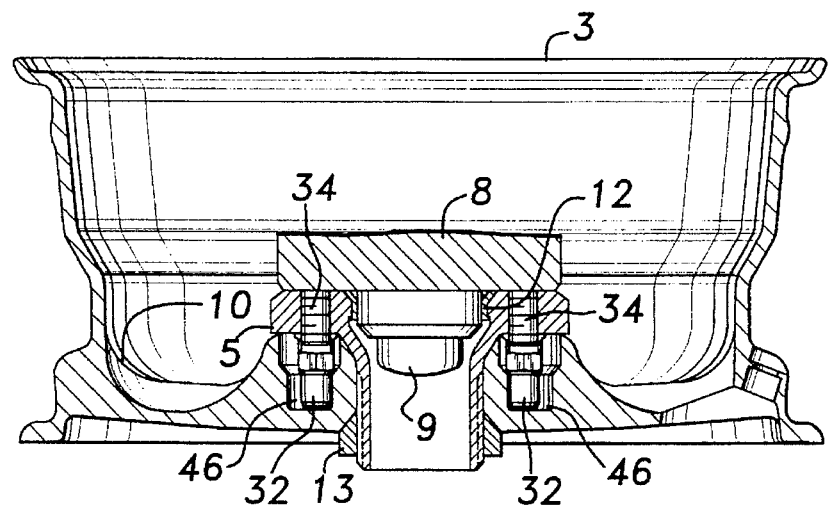
Figure 15:
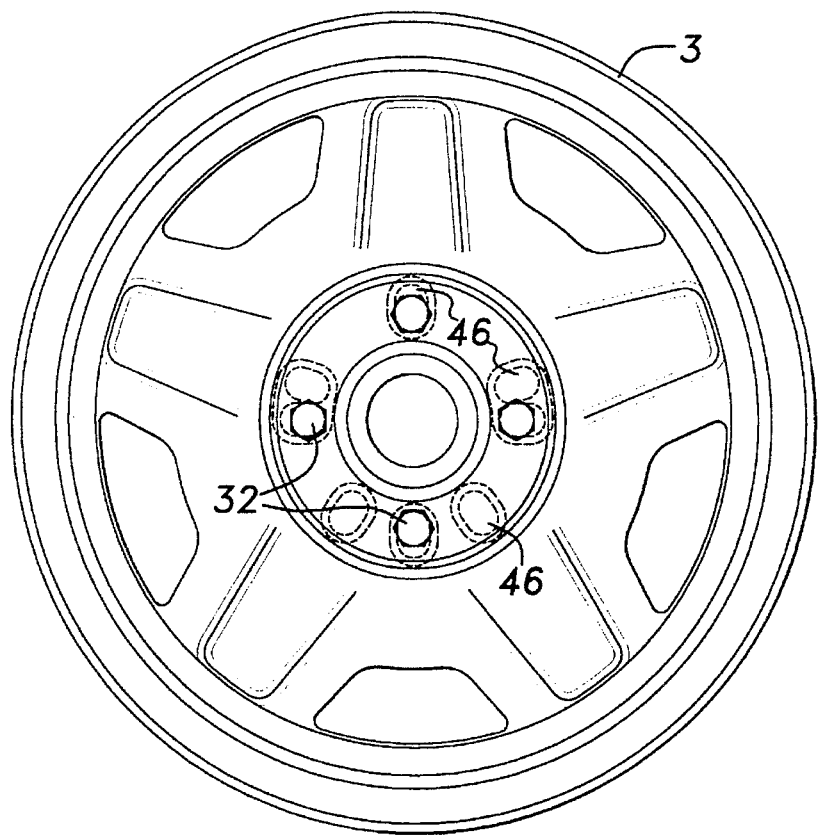
Figure 16:
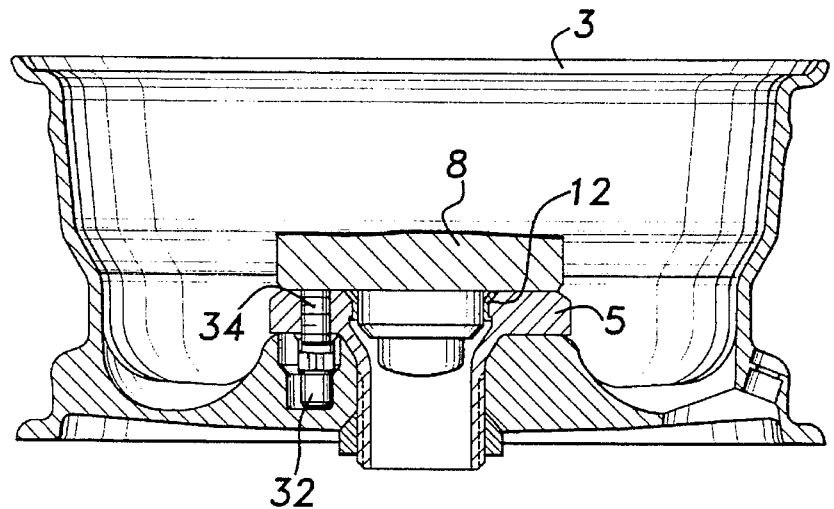
Figure 17:
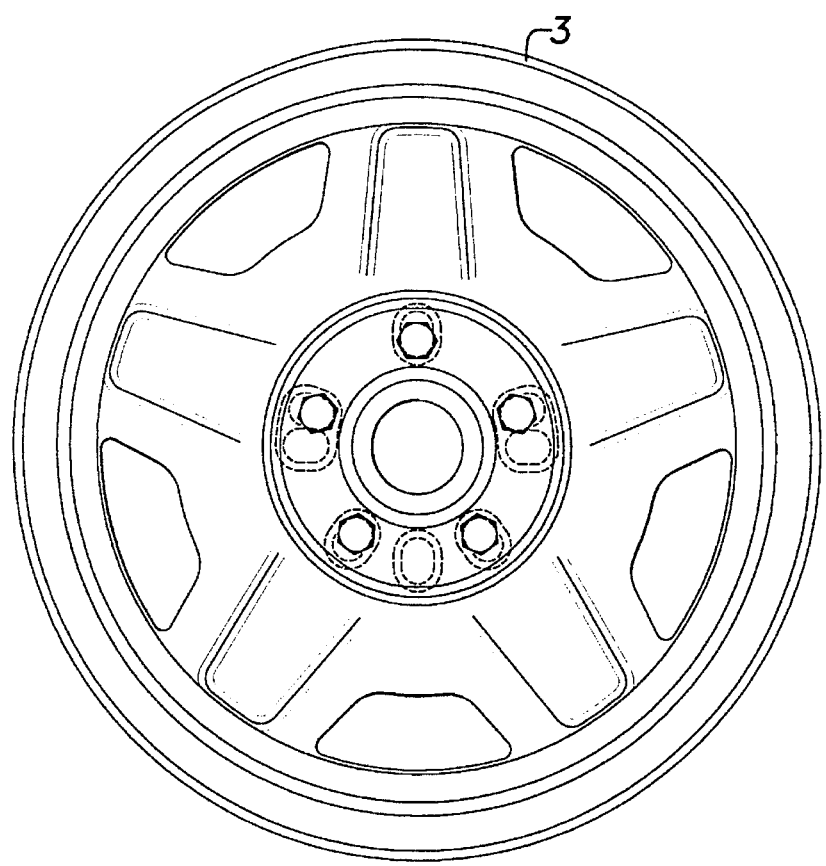
Figure 18:
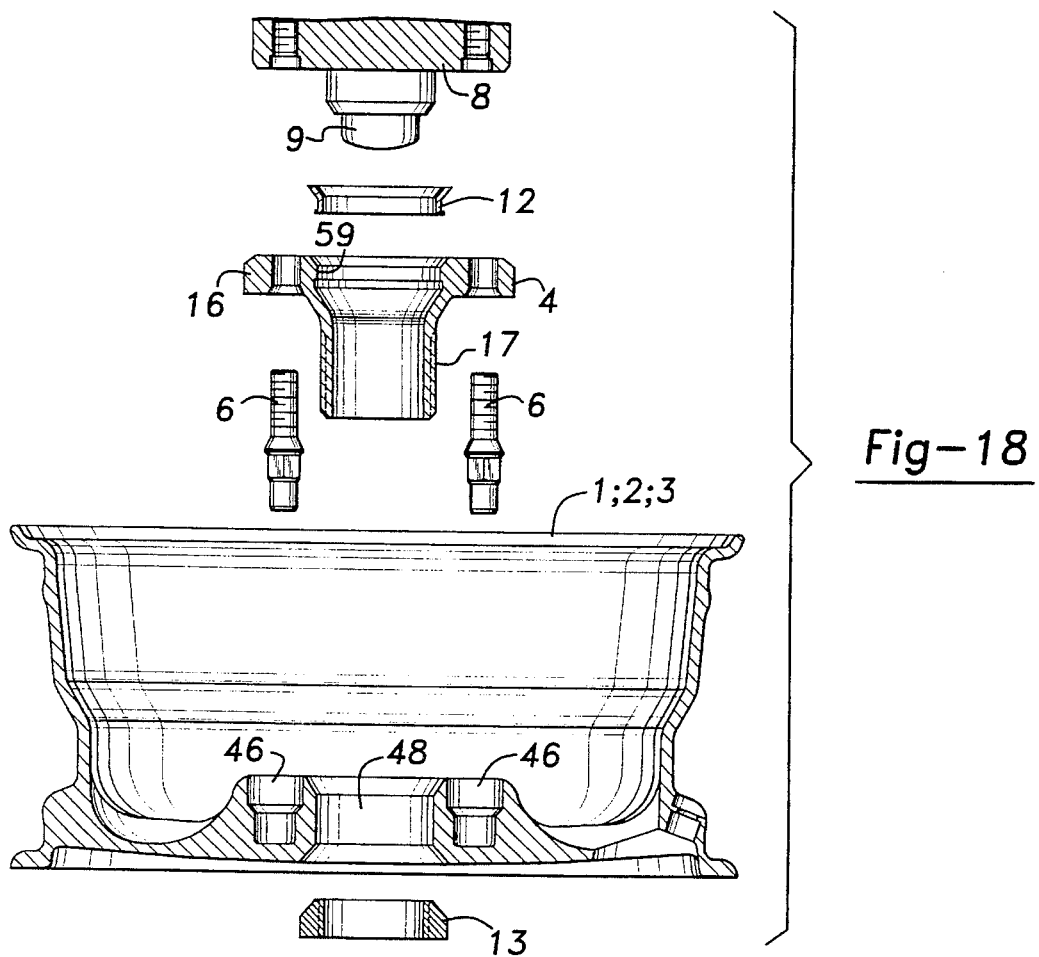

In order to fix the rim 1 to the vehicle hub 8 which is partly shown in FIGS. 10 and 18 a hub adapter 4 of the kind as shown in FIG. 7 is used in connection with a distance piece 12 as shown in FIG. 18 and a central closing screw nut 13 as shown in FIGS. 10 and 18.

The hub adapter 4 is provided with a hollow cylinder 17 extending through the centric wheel rim bore 48. This hollow cylinder is provided with an external thread as well as at its rear part contacting the vehicle hub or brake disc or brake drum 8, respectively, with a ring flange 16. The bore of the hollow cylinder expands in general conically in the area of the ring flange 16 in order to enclose distantly the axle hub as well as the grease cap 9 at its front end and to form a seat 59 for the distance ring 12. The distance between this expanding bore and the circumference of the axle hub 58 is bridged over by the distance piece 12.

The outer diameter of the hollow cylinder 17 corresponds generally to the diameter of the wheel rim bore 48 and onto the front end of the hollow cylinder the central closing screw nut 13 is screwed.

This system takes the advantage of working for a multiplicity of diameters of the axle hubs 58 with only one hub adapter size, because the space between the circumference of the axle hub and the bore of the adapter can be filled by disc like distance pieces of corresponding size or thickness, respectively. Thus, it is possible for a vehicle holder in case he changes his car, for instance if he purchases a new model, to adapt his additional set of wheels, which is nowadays common for winter tires, by mounting additional distance discs between the hub adapter and the axle hub to the changed mounting conditions of the new car model. Thus, the tracks and the corresponding depressions of the wheels may be varied. In case it is necessary for the brakes, these distance rings, consisting of metal or plastic material or other suitable materials, may also be modified for accommodating the dimensions of the brakes. In this connection it is advantageous that the outer diameter of the distance rings 12 can be kept essentially constant and that only their inner diameter will be changed in order to adapt it to different diameters of the axle hub.

As the application of the distance ring 12 is already resulting in a central centering of the hub adapter 4 with respect to the hub of the vehicle axis or the brake disc or the brake drum, respectively, the rim 1 and thus the wheel can be centered on the axle hub by means of the centering screws 6, 33, from which in the embodiments according to FIGS. 1, 2, 7, 10, 11 and 18 four screws are used the heads of which are located in holes 46 having an elongated outline so that they can be designated as slots. In the embodiments of the unitary wheel system according to FIGS. 3, 4, 9 and 13 which is rather identical with the first mentioned embodiments five centering screws 6, 33 are used in the five slots 47 of the wheel rim 2.

The hub adapter 37 of that second embodiment provided for the use of five holes fulfils the same purpose as the hub adapter 4 provided for the four hole configuration because even the adapter 37 has the purpose of enabling the use of a wheel of aluminum for every car having a hole circuit diameter of between 98 and 122 mm.

Figure 1:
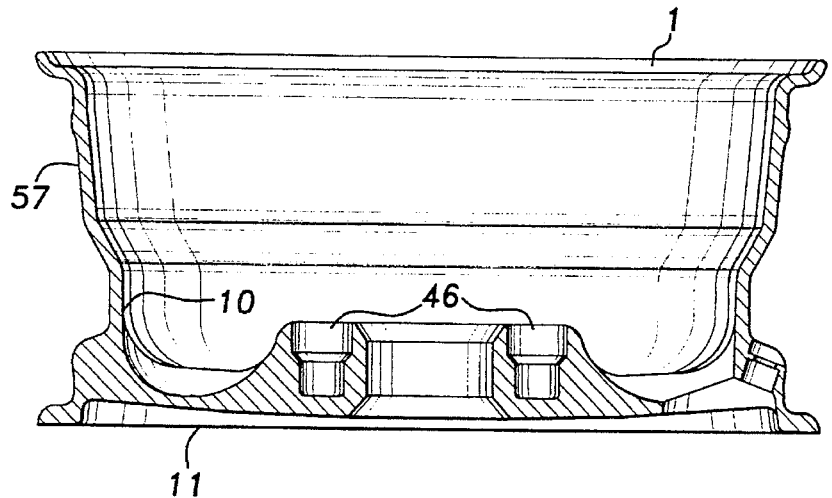
FIGS. 1 and 2 show a rim 1 of aluminum for one embodiment of the unitary wheel system receiving in a manner known per se in the rim bed 57 the tire of a car. The rim is provided on its rear side 10 with four in the same angular distance on a peripheral circuit positioned blind holes 46 which receive the heads of centering screws 6, as shown in FIG. 18.
Figure 2:
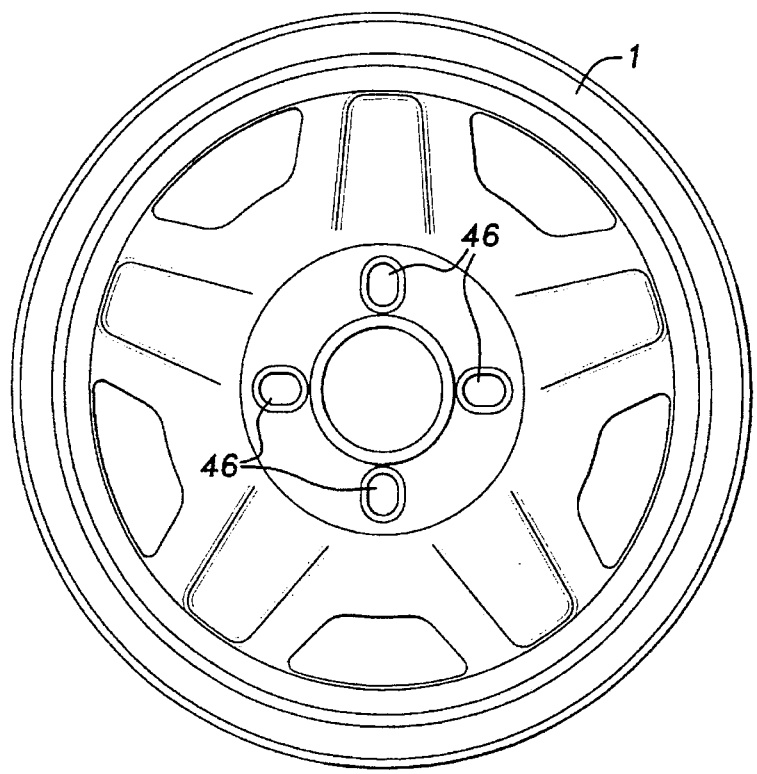
Figure 3:
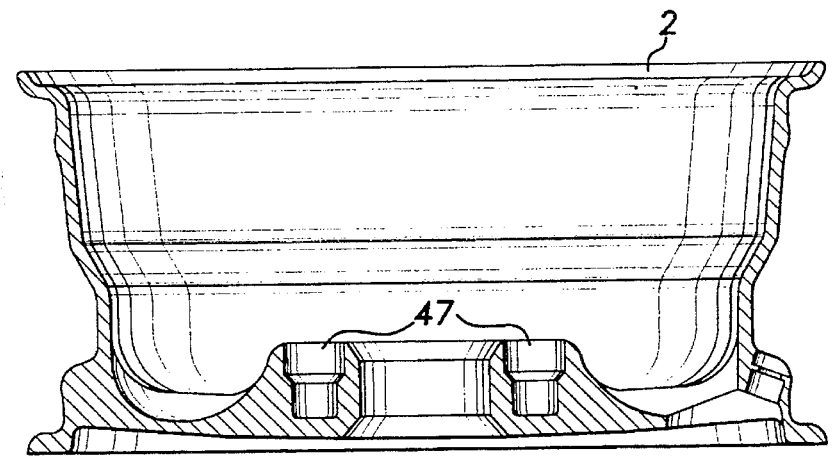
Figure 4:
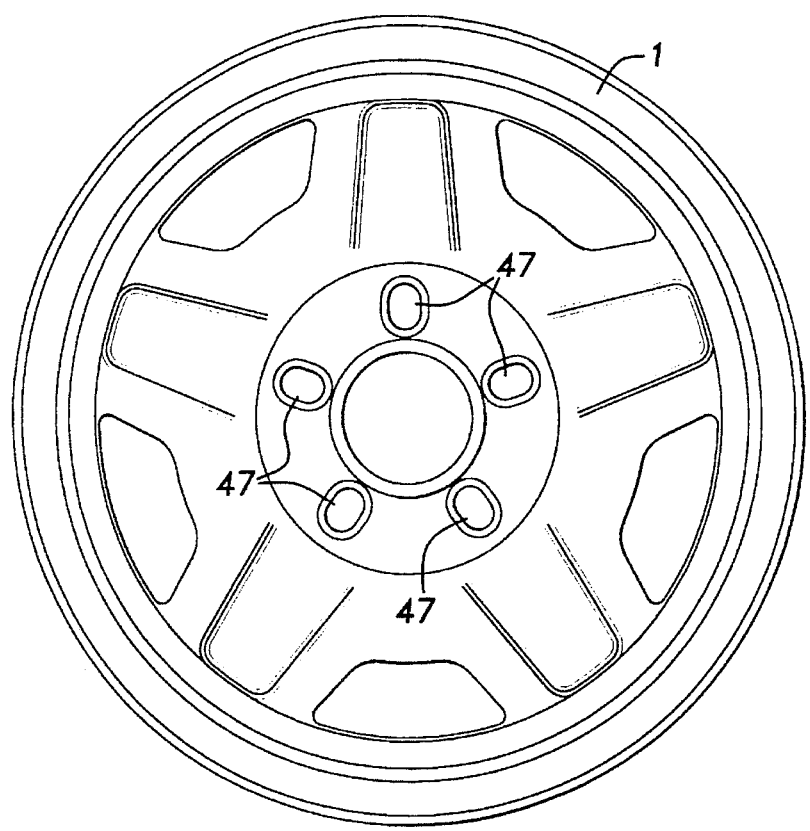
Figure 5:
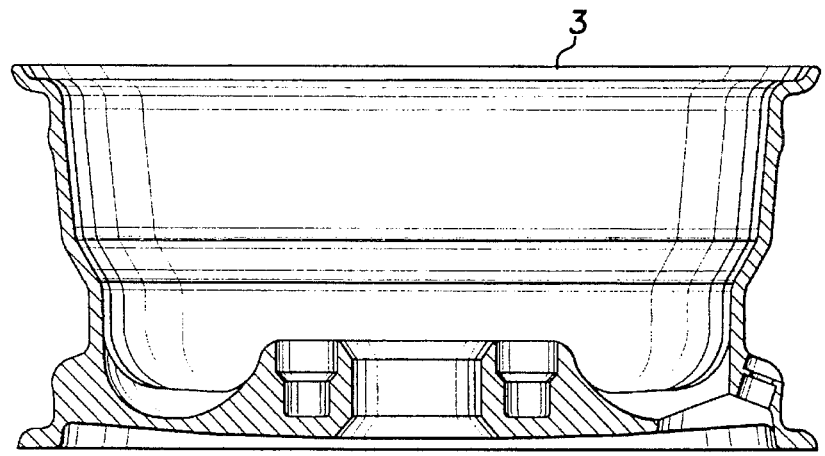
Figure 6:
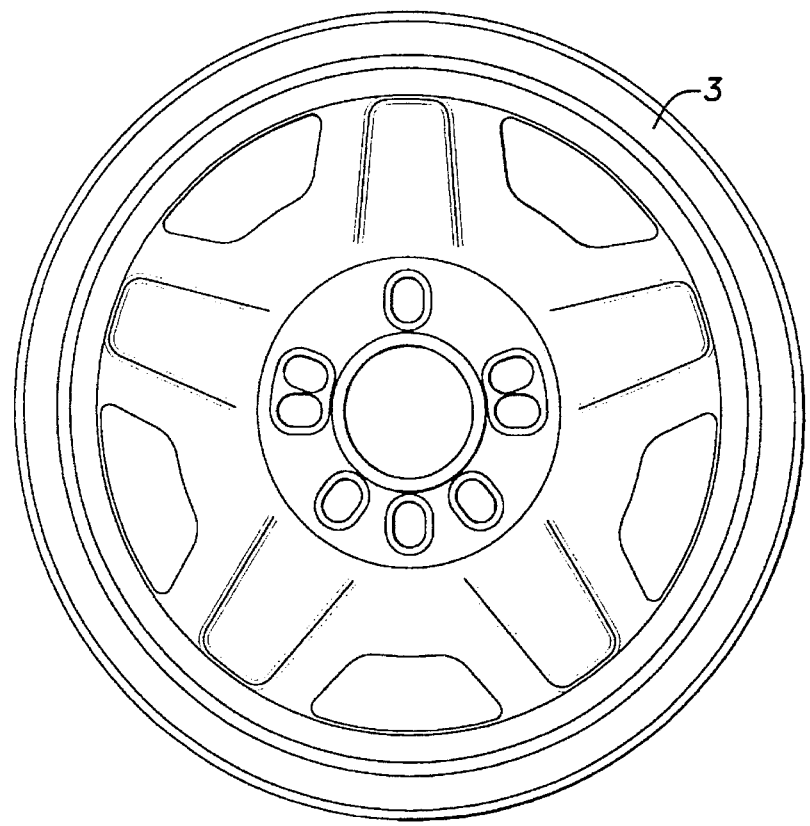

The above mentioned hub adapters 4, 37 onto which a central closing screw nut is threaded and which are suitable for a four-hole configuration or a five-hole configuration are completed by the embodiment of the unitary wheel system according to FIGS. 5 and 6 corresponding essentially to both of the first mentioned embodiments, being, however, provided with a combined four-five-hole arrangement, as shown in FIG. 6. Thus, that wheel rim may be used for cars having only four connecting holes in their axle hub as well as having five connecting holes.

Figure 8A:
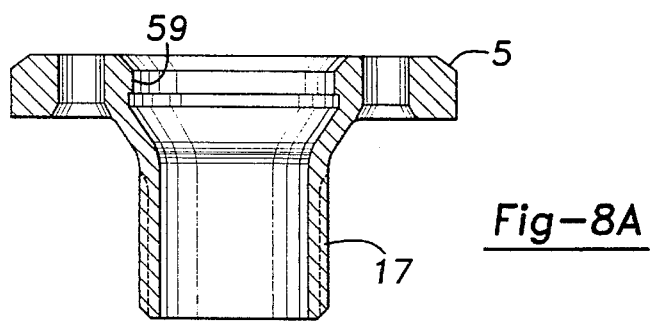
Figure 8B:
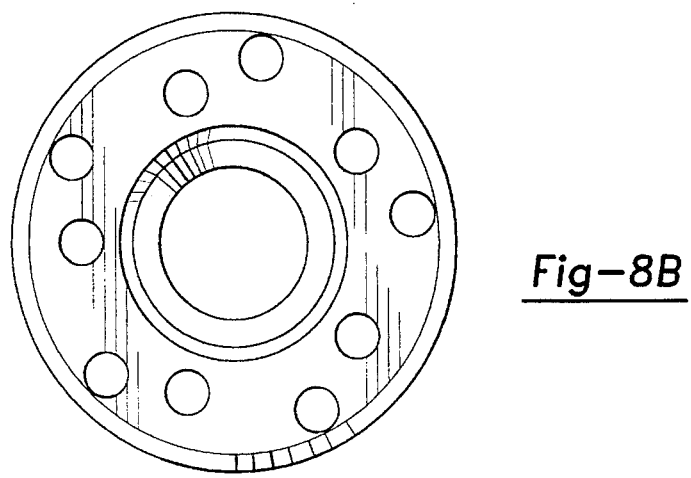
Figure 9A:
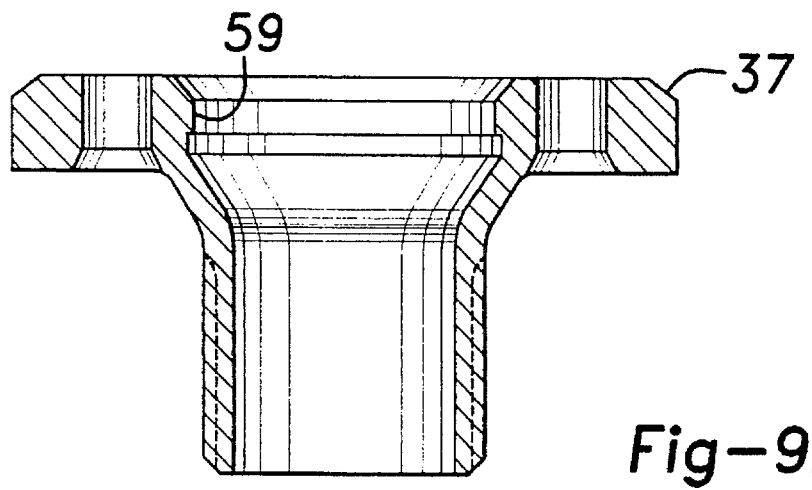
Figure 9B:
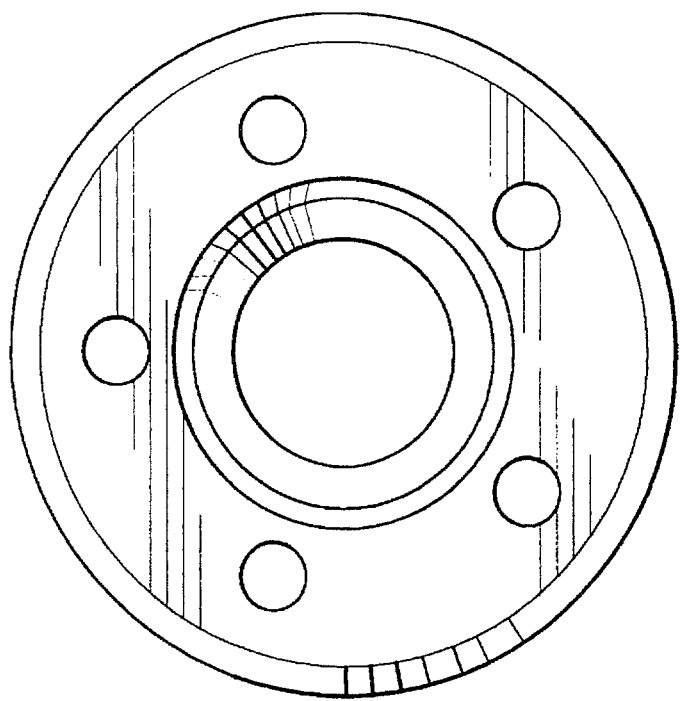

Moreover, it is possible to provide as shown in FIG. 8 the five hole configuration simultaneously with two hole circuits in order to reach an adaptation to different hole circuit diameters of the axle hub.

Figure 19:
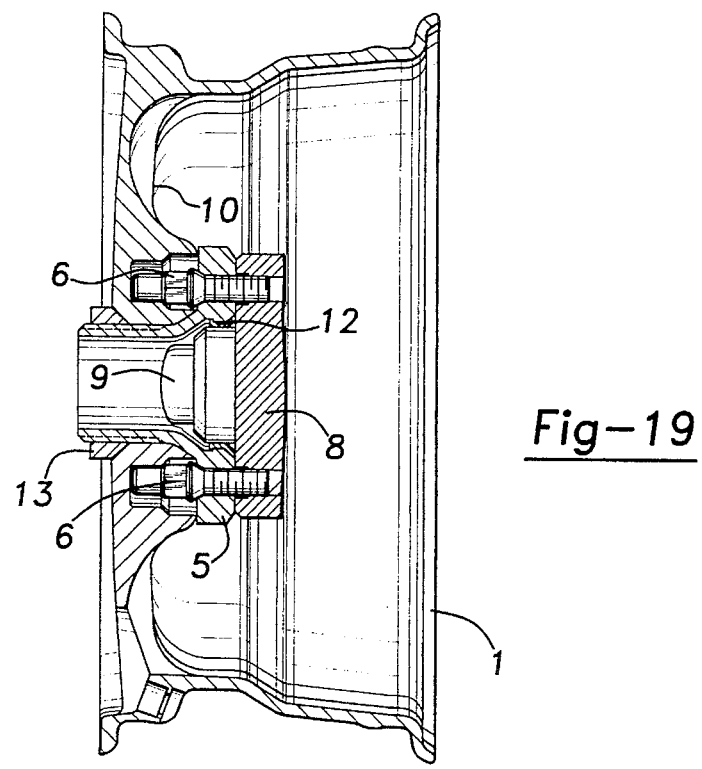
Figure 20:
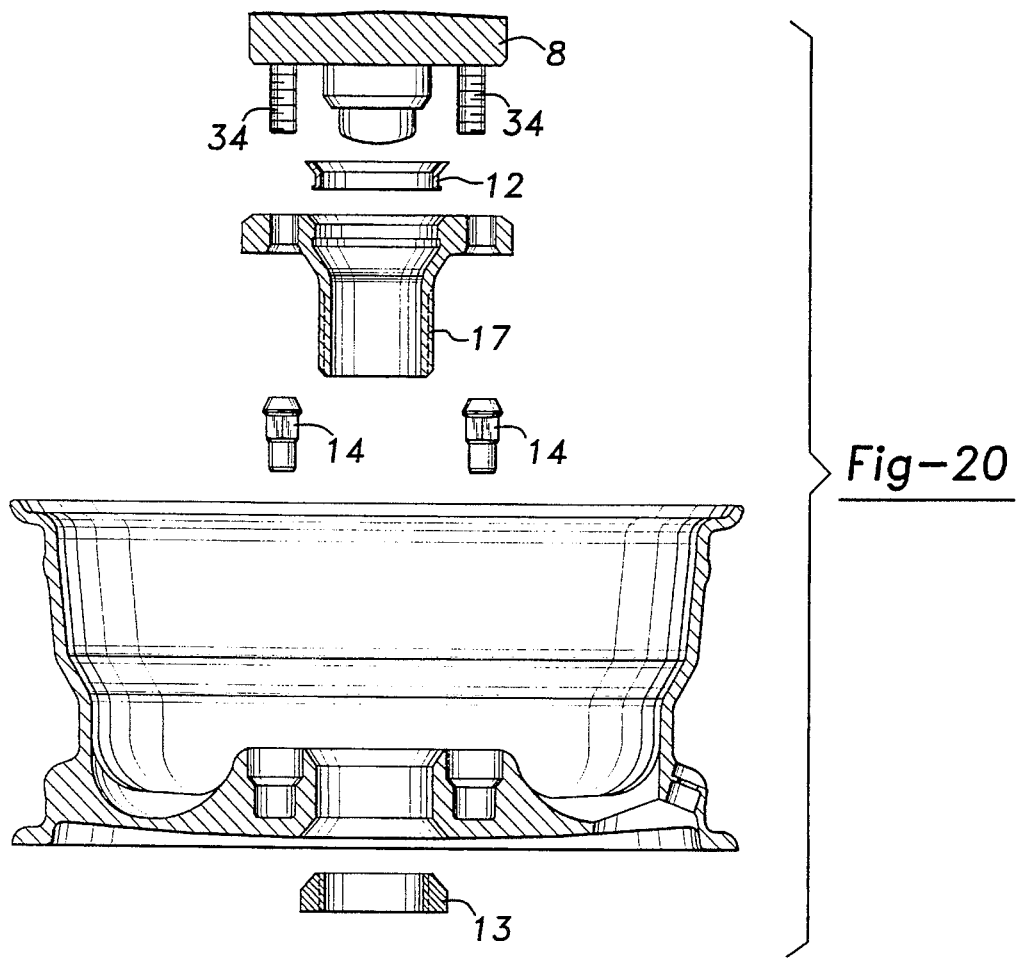
Figure 21:
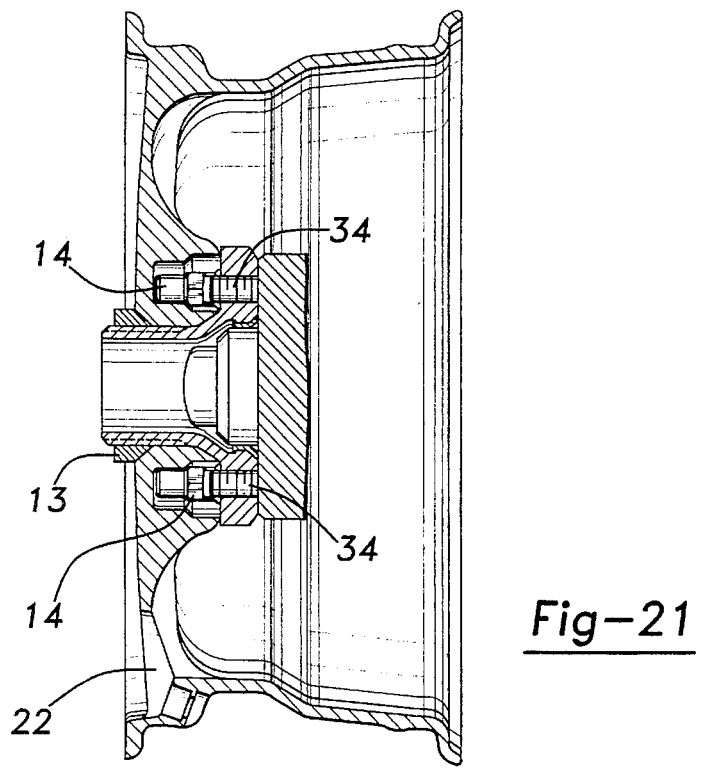

The centering of the wheel cannot only be assured by means of centering screws 6 as once more disclosed in the mounting configurational view of FIG. 19 but also by means of centering nuts 14 in case of the fact that the hub 8 of the vehicle is provided with stand bolts 34 onto which such kind of nuts may be screwed as shown by FIGS. 14, 15, 16, 17, 20 and 21. In this connection the wheel construction shown in FIGS. 14 and 15 concerns a four hole configuration in which the hexagon centering nuts 32 corresponding to the centering nuts 14 within the explosion view of FIG. 20 are screwed onto the stand bolts 34 and placed in the holes 46 with an elongated outline of a combined four-five-hole configuration of the wheel rim 3, whereas FIGS. 16 and 17 demonstrate the mounting situation for five centering nuts in a combined four-five-hole configuration. The arrangement of the hub adapter 5 and distance rings 12 corresponds to the above described embodiments. In each case the above described elongated holes or slots 46, 47 on the rear side of the wheel rim are enabling the use of a wheel by means of a hub adapter for vehicles having a hole circuit diameter of 98 mm with four holes up to a hole circuit diameter of 120 mm with five holes.

Figure 24:
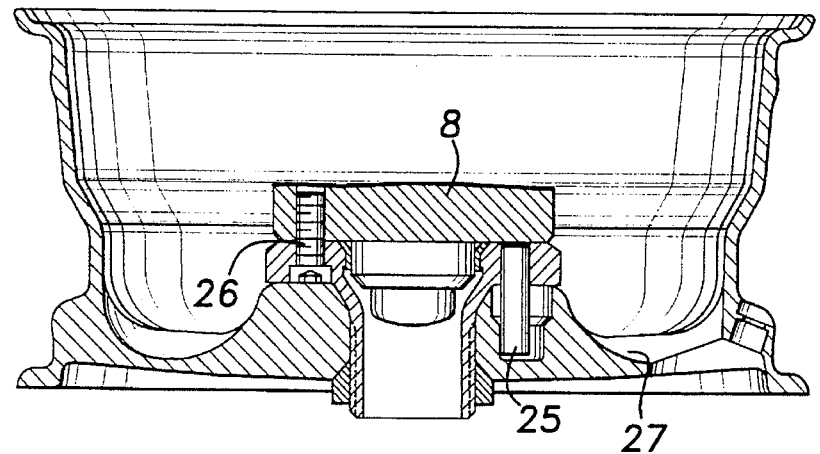
Figure 25:
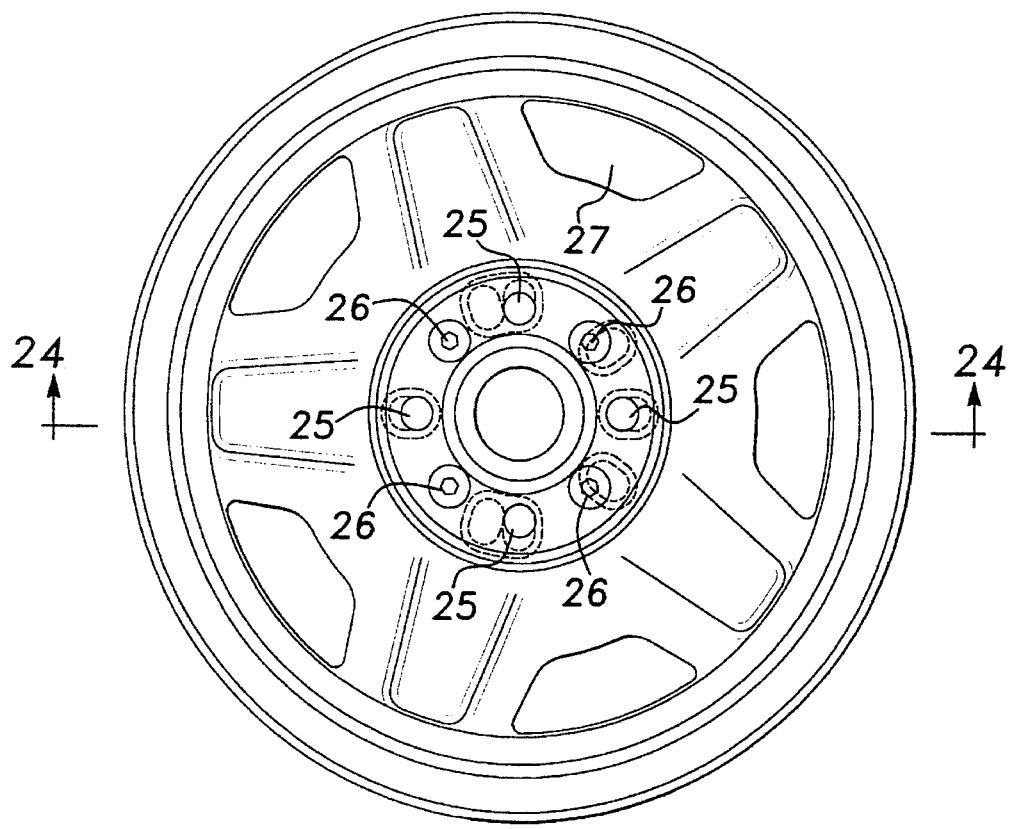
Figure 26:
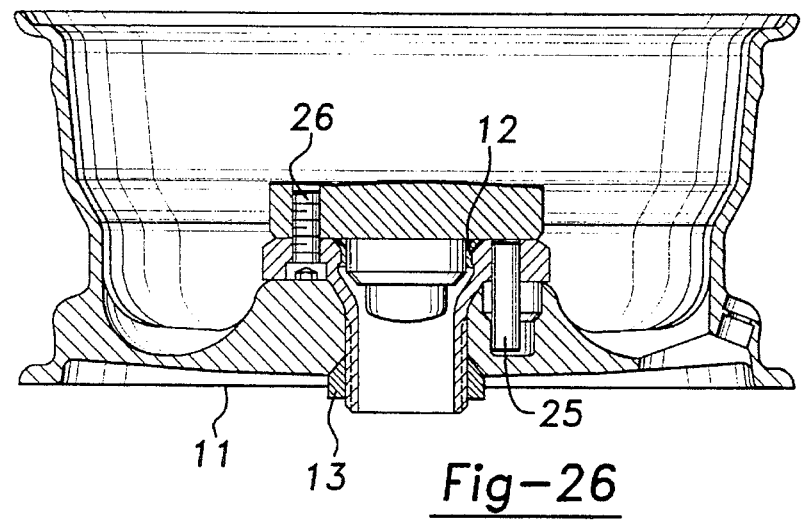
Figure 27:
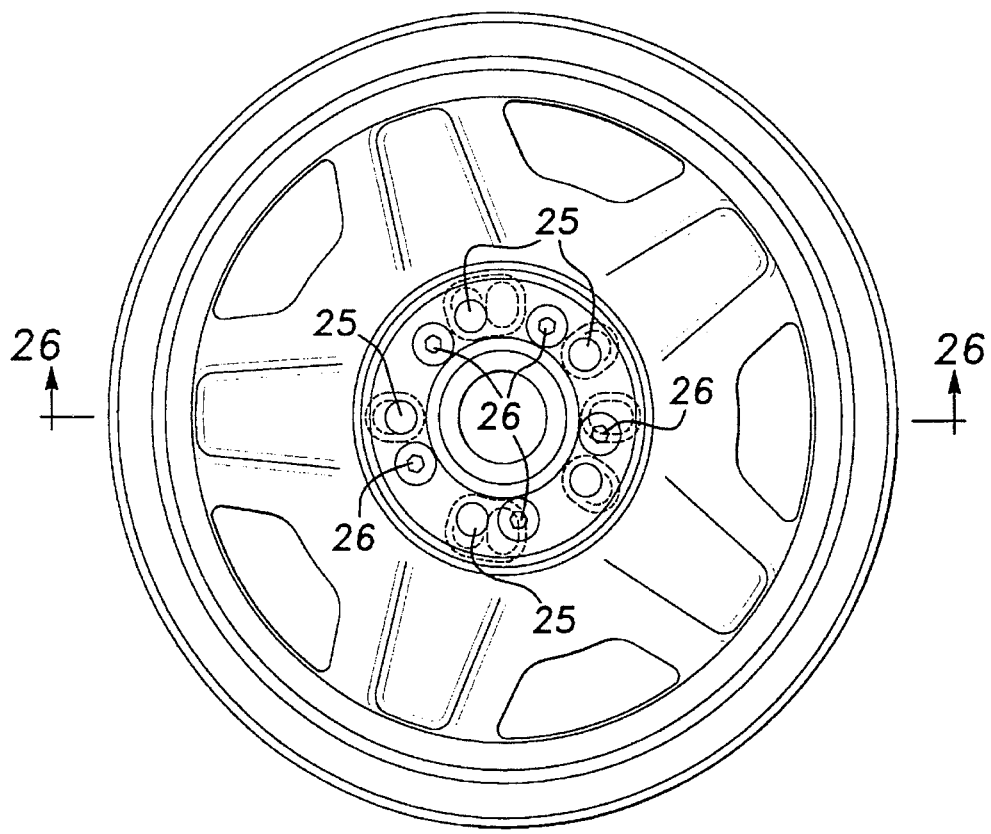
Figure 30A:
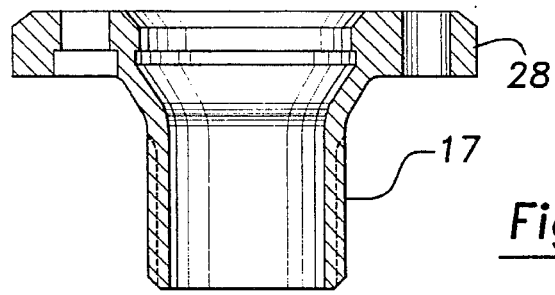
Figure 30B:
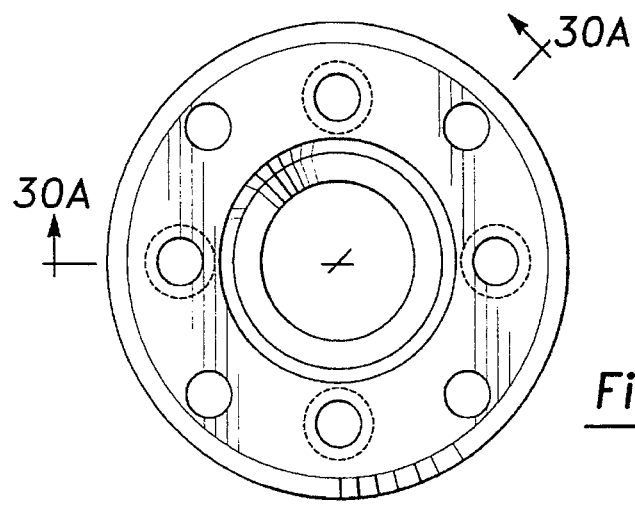
Figure 31:
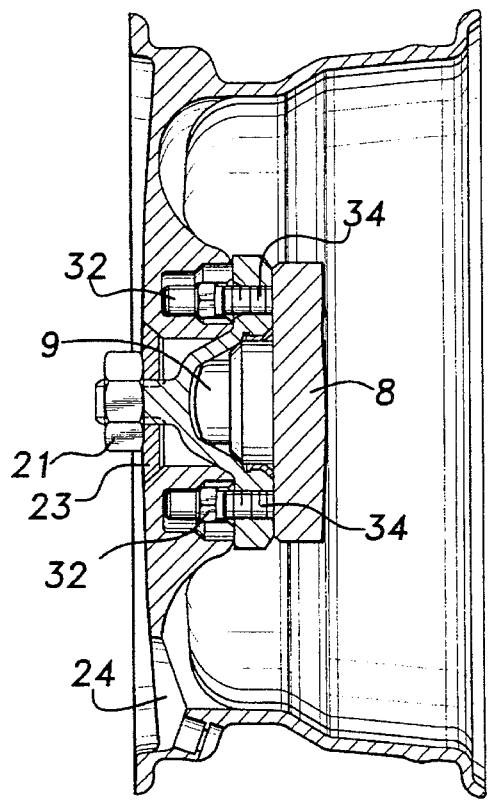
Figure 32:
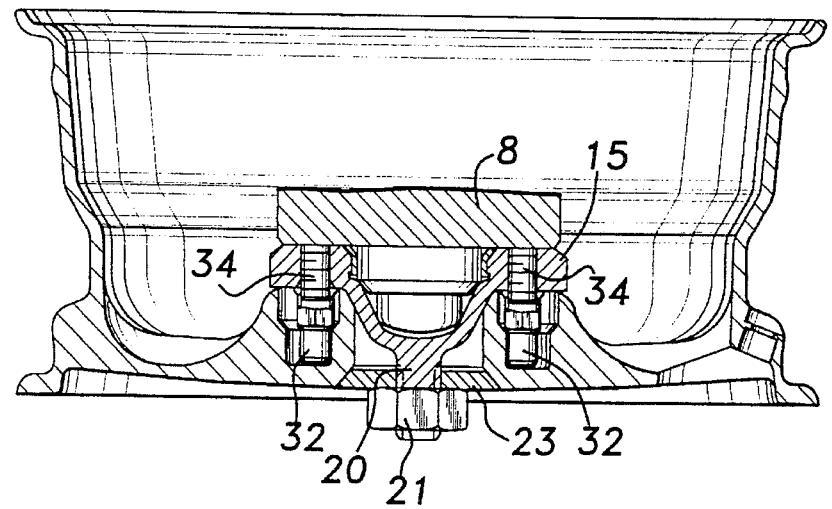
Figure 33:
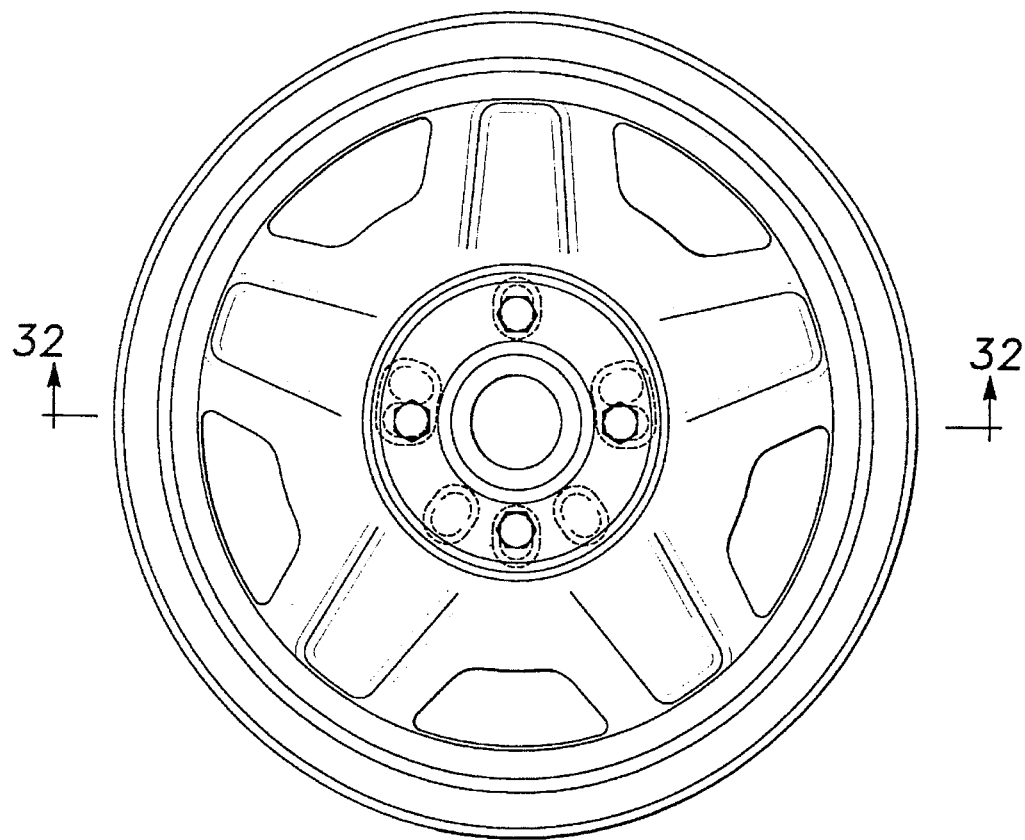
Figure 34:
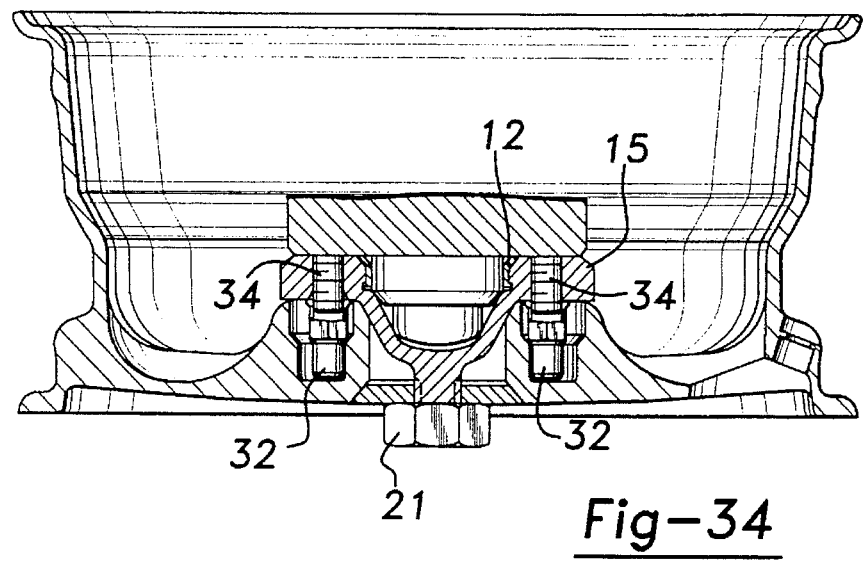
Figure 35:
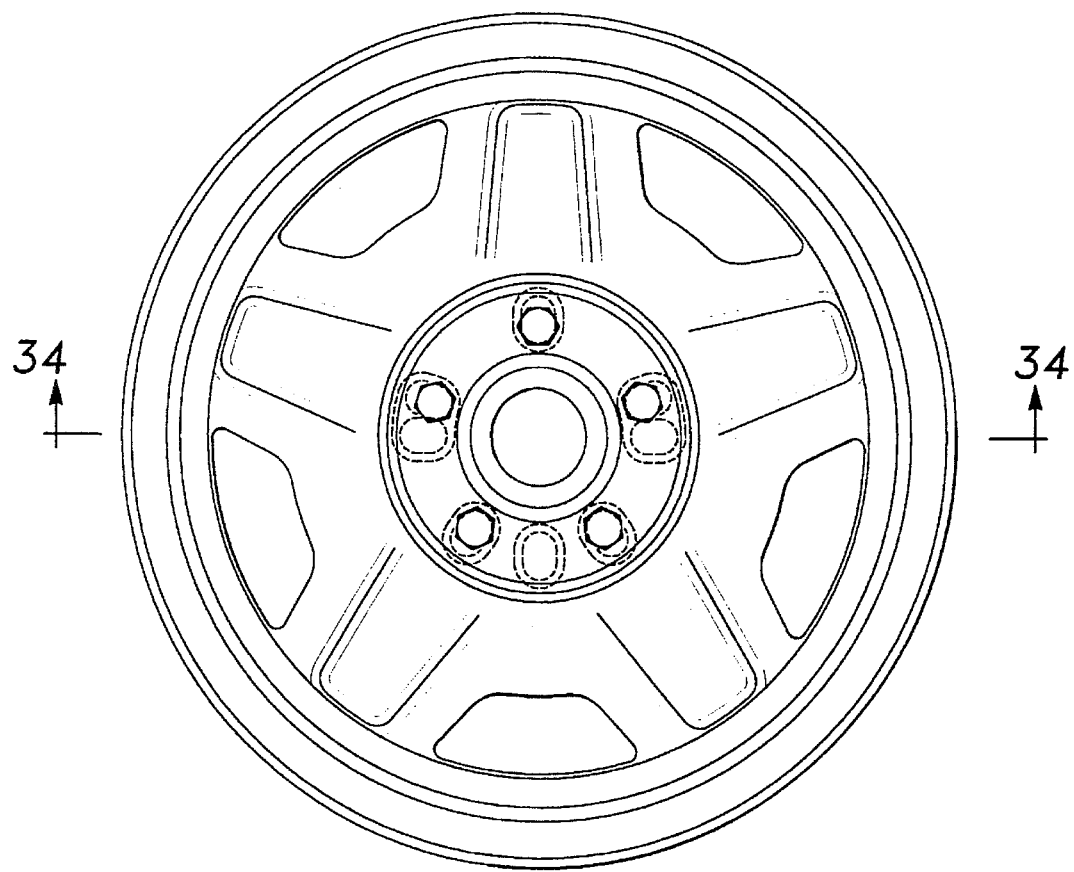

A further embodiment of the construction of the described unitary wheel system with respect to the connection of the hub adapter to the hub 8 of the vehicle and the centering of the wheel or wheel rim, respectively, on using a central closing screw 13 shown in FIGS. 24 and 25 for a four-hole configuration as well as in FIGS. 26 and 27 for a five-hole configuration is disclosed in FIG. 28 in form of an explosion view of these last mentioned two embodiments as well as in FIG. 30 with respect to the utilized hub adapter. In that construction the hub adapter 28 is screwed by means of machine screws 26 to hub 8 of the vehicle and the wheel rim will be centered by means of centering fit pins 25 placed in corresponding bores of the hub adapter 28, which fit pins are engaging the elongated holes on the rear side 10 of the wheel rim, as disclosed in FIGS. 25 and 27. In this manner as well as in the above mentioned cases of the centering of the wheel the positive engagement is gained as requested by the authorities if a central closing nut 13 is utilized for the connection of the wheel. It goes without saying that the torque must be transmitted as in case of ordinary wheels by means of frictional contact through the supporting surface. For that purpose the central closing screw nut will be fastened using a defined torque.

Figure 22:
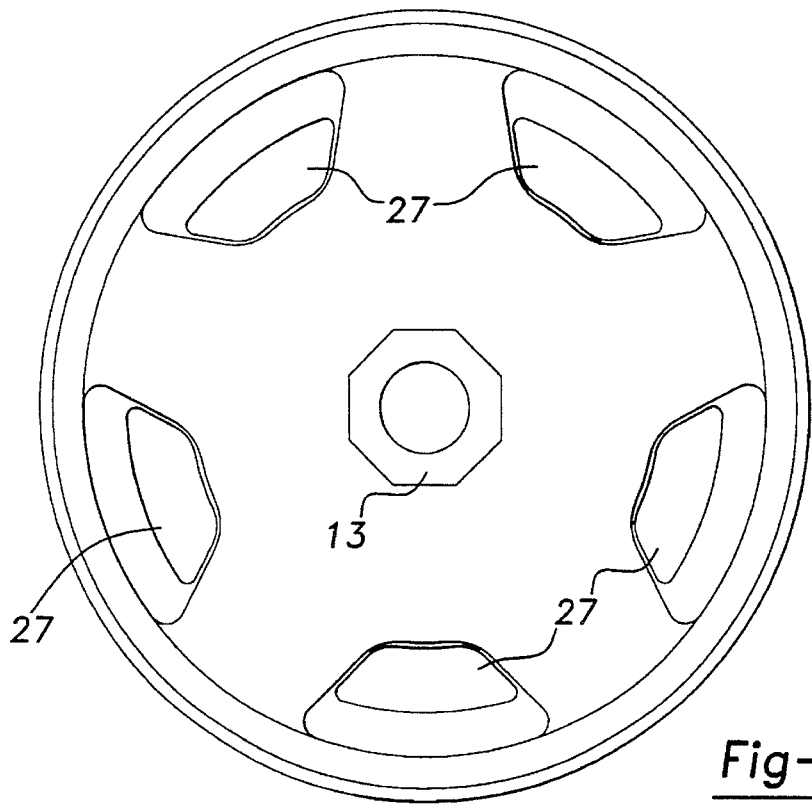

In the above mentioned embodiments of the construction of the unitary wheel system the wheels are attached by means of a central closing screw nut 13 which is screwed onto the cylindrical bushing of the hub adapter and which is pressed against the front side 11 of the wheel rim. A front view of a such attached unitary wheel is shown in FIG. 22, wherein the numeral 27 designates the rim openings at the front side.

A further embodiment of the hub adapter 15 in which the cylindrical part 20 extending through the wheel rim is not configured as a hollow cylinder or a tube but as a tap onto which the central closing screw nut 21 is screwed, is shown in FIGS. 23, 29, 31, 32, 33, 34, 35 and 36 in connection with other constructional features. The central closing screw nut 21 which can be in this case a ordinary machine nut is placed in screwed condition on a disc 23 (FIG. 36) within the opening of the wheel rim bore 48, and the rear end of the tap 20 continues in the direction of the rear end of the hub adapter 15 to become an expanding cone enclosing the grease cap 9 as well as a connecting flange 18 which can be compared with the connecting flange 16 of the above mentioned embodiment of the hub adapter.

Figure 23:
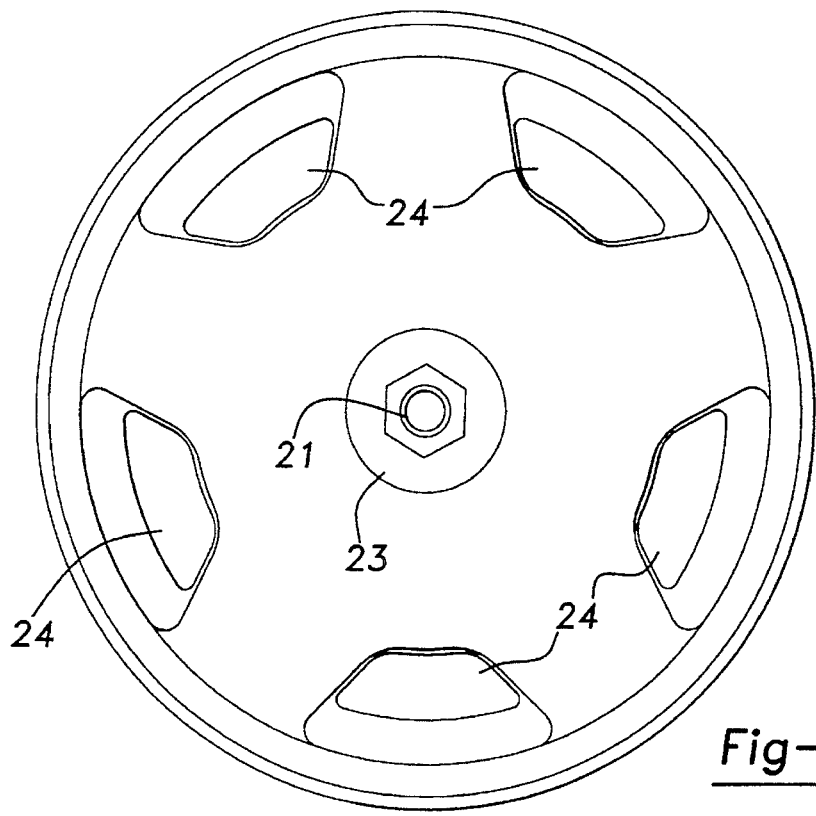

The front view of the wheel which is attached by means of a central closing screw in form of a machine nut 21 is shown in FIG. 23, wherein the rim openings on the front side of the wheel rim are designated by 24.

The above mentioned configuration of the hub adapter which is characterized by a tap extending through the wheel rim and provided with an external thread on which the wheel nut may be screwed can be compared with respect to the remaining constructional and functional elements with the bushing like hub adapter 4, 5. Thus, the above mentioned explanations with respect to the attachment and centering of the adapters on the axle hub 8 are also true for the present case which can be gathered from comparing the respective Figures of the drawings. Thus, also the last mentioned hub adapter 15 enables the insertion of distance rings in order to bridge over the distance between the hub surface of the vehicle and the seat of the distance ring within the hub adapter. From this follows that also that hub adapter may be suited for different vehicle models or types.

Figure 36:
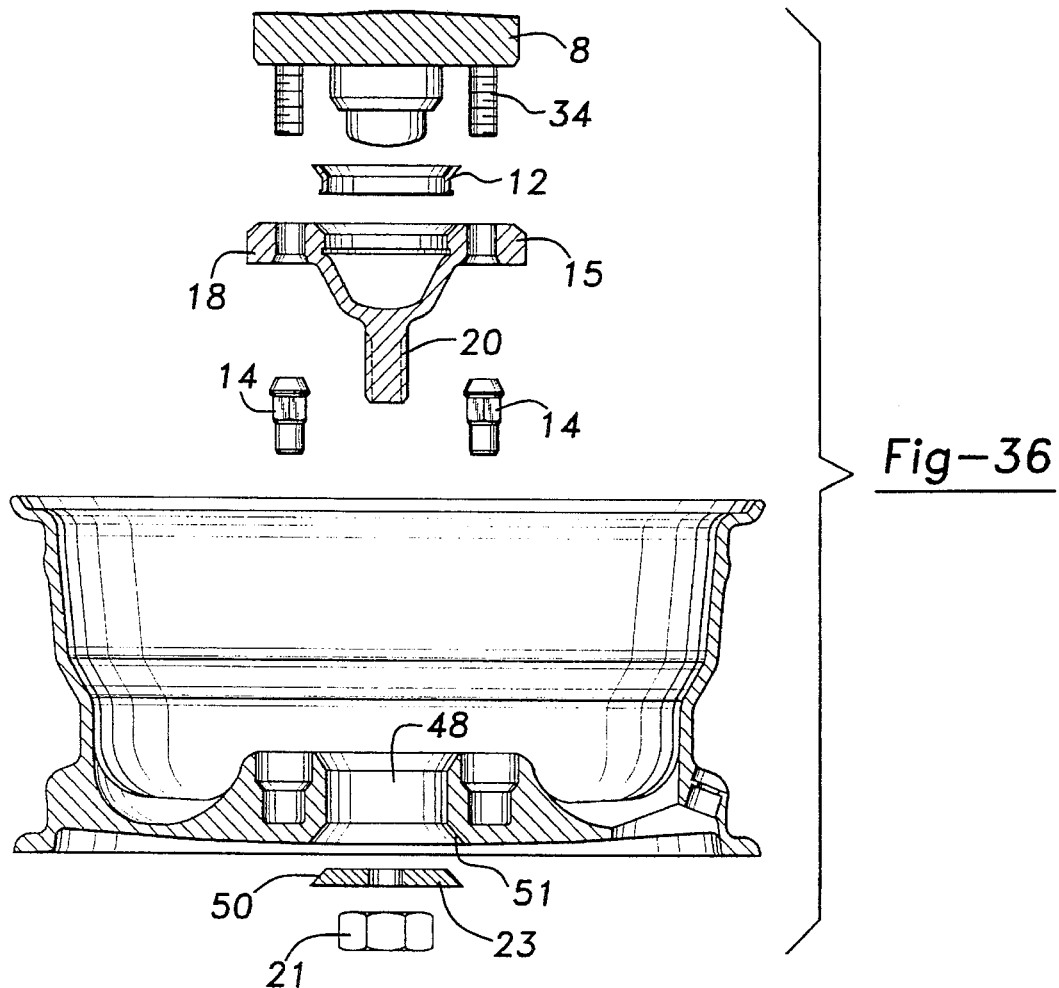

Instead of the disc 23 on which in screwed on condition of the wheel the central closing nut 21 is placed and which is provided with a cortically configurated peripheral edge 50 located within correspondingly configurated seat 51 within the central opening 48 of the wheel rim, as shown in FIG. 36, the wheel nut 21 can also be provided with a conic collar.

In case the wheel or the wheel rim, respectively, should not be attached by means of a central closing nut but by means of ordinary wheel screws available from the outer side 11 of the wheel rim the hub adapter 29, 39 can be configured as shown in FIGS. 37 to 47, wherein the wheel rim 49, 50 can be attached by means of the adapter as well as of at least one centering element 36, 44 and several wheel screws to the vehicle hub or the brake disc or the brake drum 8, respectively, by using distance rings which as in case of the above mentioned constructions are inserted into the hub adapter in order to adapt its passage opening to different hub diameters of the vehicle.

Figure 37:
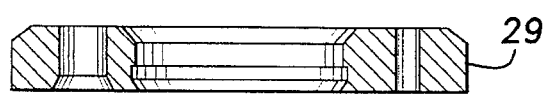
Figure 38:
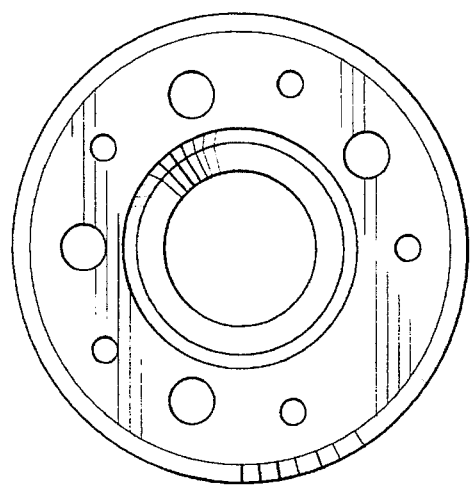
Figure 40:
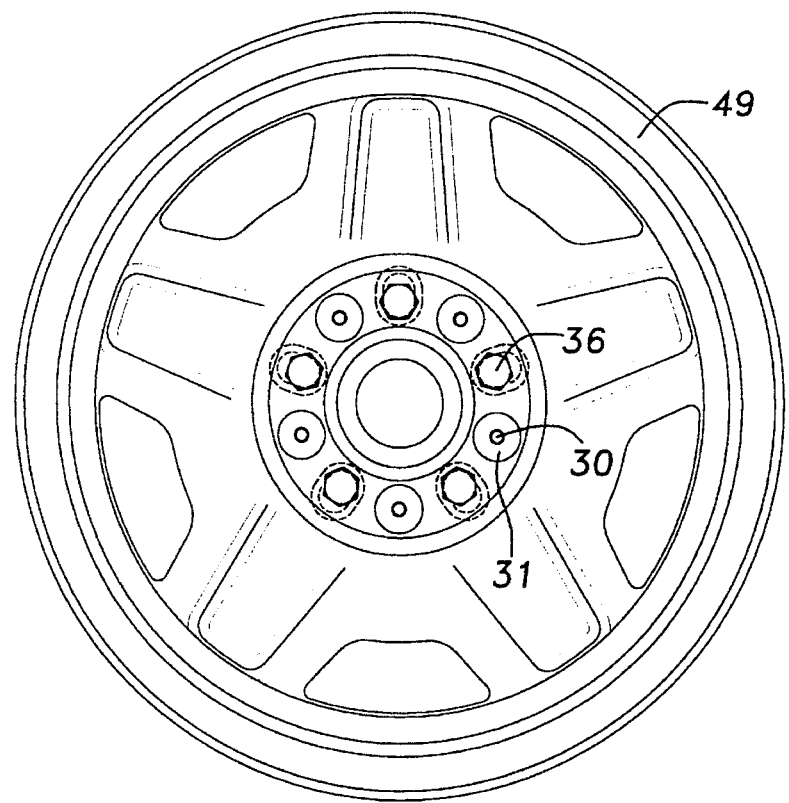

As can be gathered from FIGS. 37 and 38 the hub adapter 29 is a flat disc which can be attached by means of centering collar screws 36 to the axle hub 8 of the vehicle enclosing in such a way the axle hub 58. The inserted distance ring 12 is provided with a wall thickness which is sized such that it can span the distance between the axle hub surface and the seat surface for the distance ring within the hub adapter. By means of wheel screws 30 which can be inserted through the openings 31 in the front side 11 of the wheel rim that wheel rim 49 can be screwed onto the hub adapter. FIG. 40 shows the embodiment wherein within the spaces of a five-hole-configuration for the centering collar screws 36, the heads of which are placed in elongated holes, five machine screws 30 are provided so that the angularly configurated hub adapter 29 is provided with the passage bore arrangement for the centering collar screws and the wheel screws as shown in FIG. 38, which are placed within the wheel rim fix such a kind that only the wheel screws 30 are available from outside.

Figure 39:
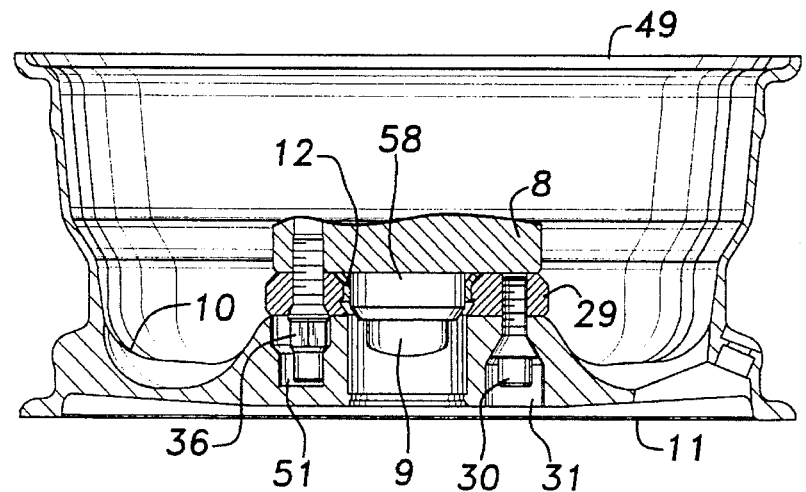
Figure 41:
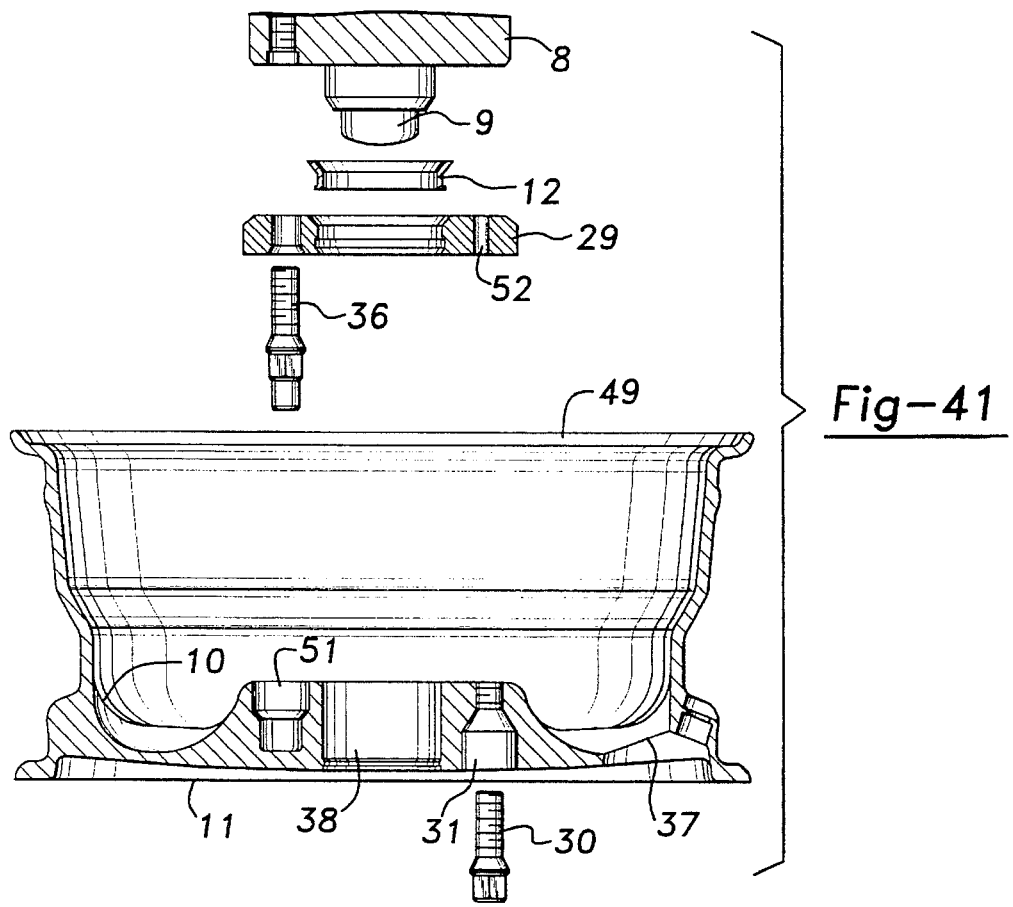
Figure 42:
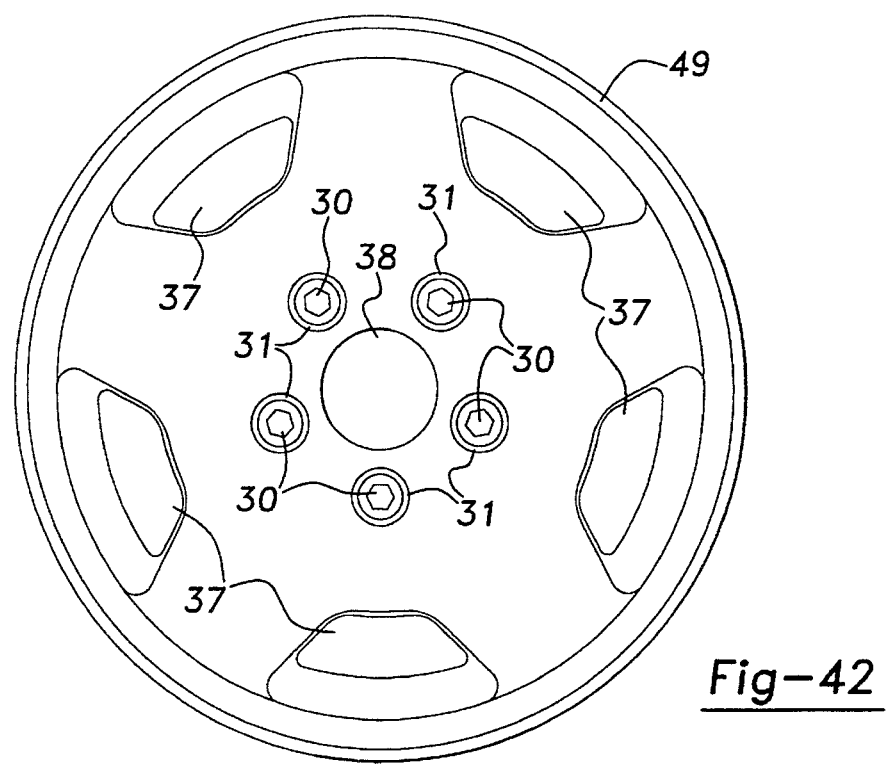
Figure 43:
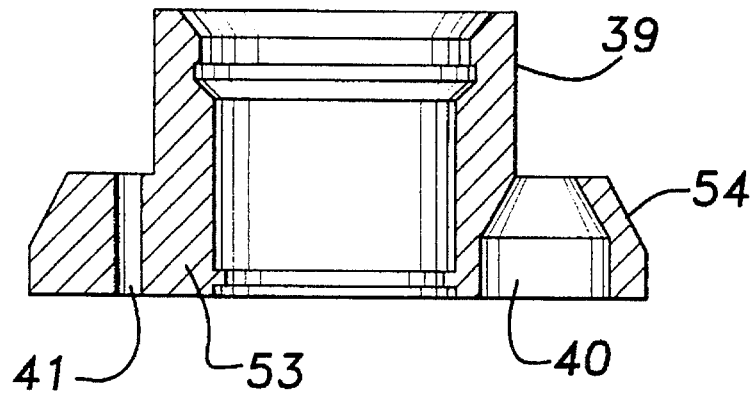
Figure 44:
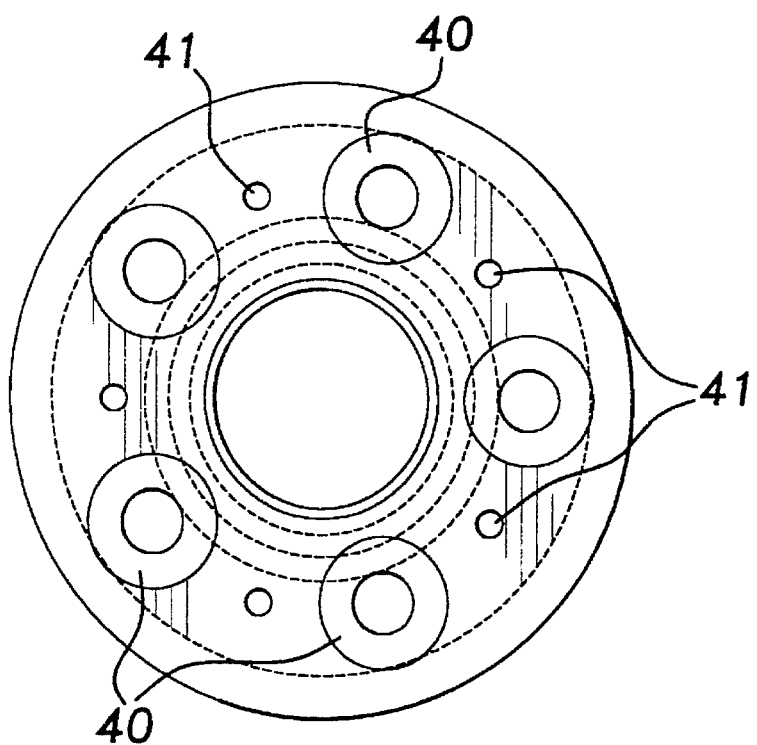

The above mounting situation reveals from the mounting configurational view as shown in FIG. 41, whereas in FIG. 42 the front view of the wheel as shown in FIGS. 39 to 41 is disclosed in mounted condition from which can be seen that the from 11 of the wheel rim 49 is provided with passage openings 37 as well as with a central opening 38.

The further constructional embodiment of the unitary wheel system as shown in FIGS. 43 to 47 is characterized by a hub adapter 39 which is inserted into a large opening 55 in the front side 11 of the wheel rim 50 and is provided within that opening with a positive engagement by means of either the application of indentation or by means of fit pins 44 against rotation of the wheel in case of a possible release of the screws. The hub adapter 39 is provided for that purpose with an edge flange 53 having a cylindrical extension 58 in the rear end of which the seat for the distance ring 12 is provided which as in the above mentioned embodiments over bridges the distance between the surface of the axle hub and the seat surface.

The thus configured hub adapter the cylindrical extension 58 of which is surrounded by the wheel hub 56 is provided with screw bores 40, 45 for the wheel screws 43 in order to attach it to the wheel hub 8 of the vehicle so that different hub adapters are necessary for the connection at those points of the vehicle at which the attachment takes place by screwing.

Figure 45:
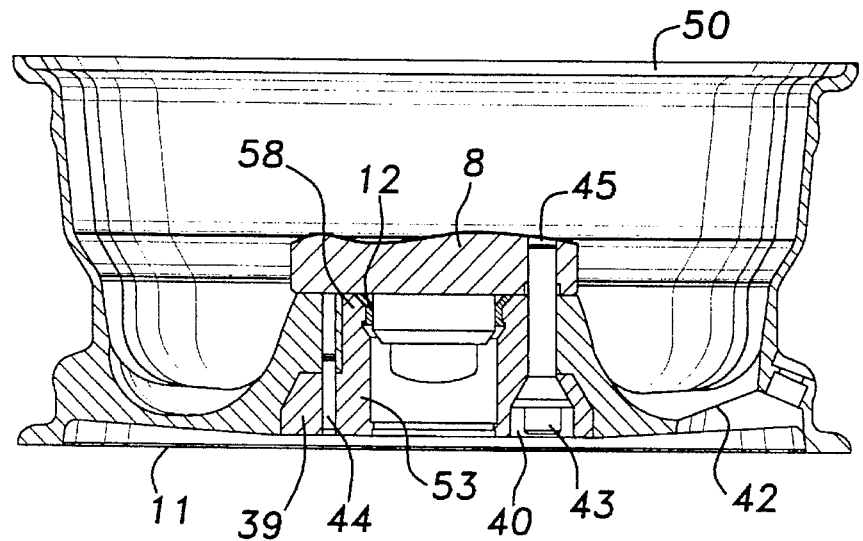
Figure 46:
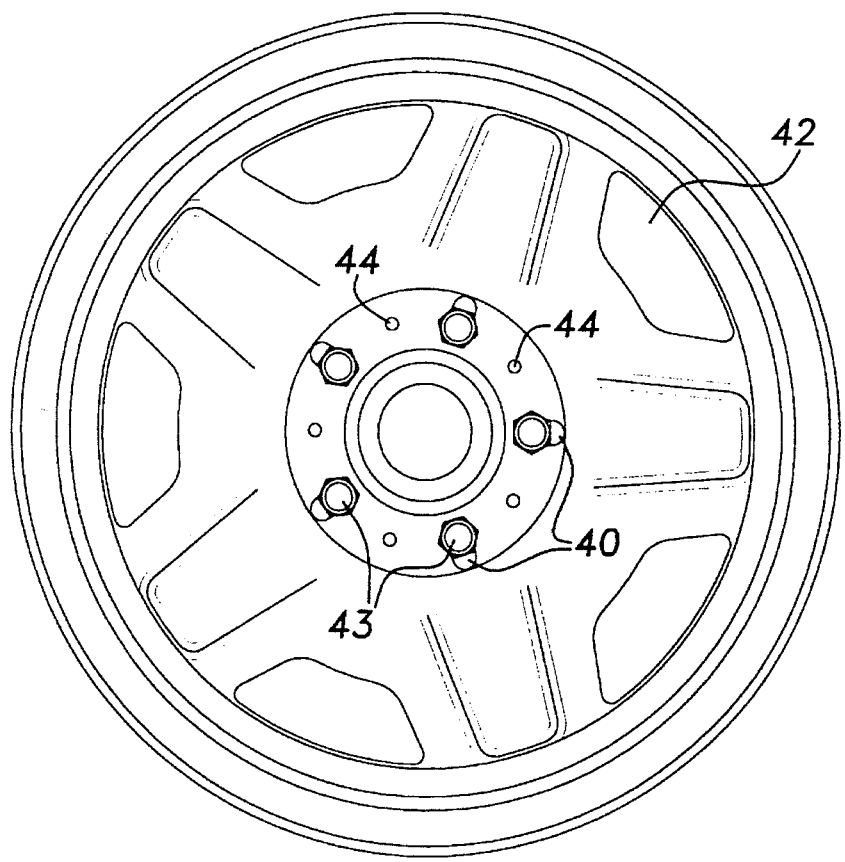
Figure 47:
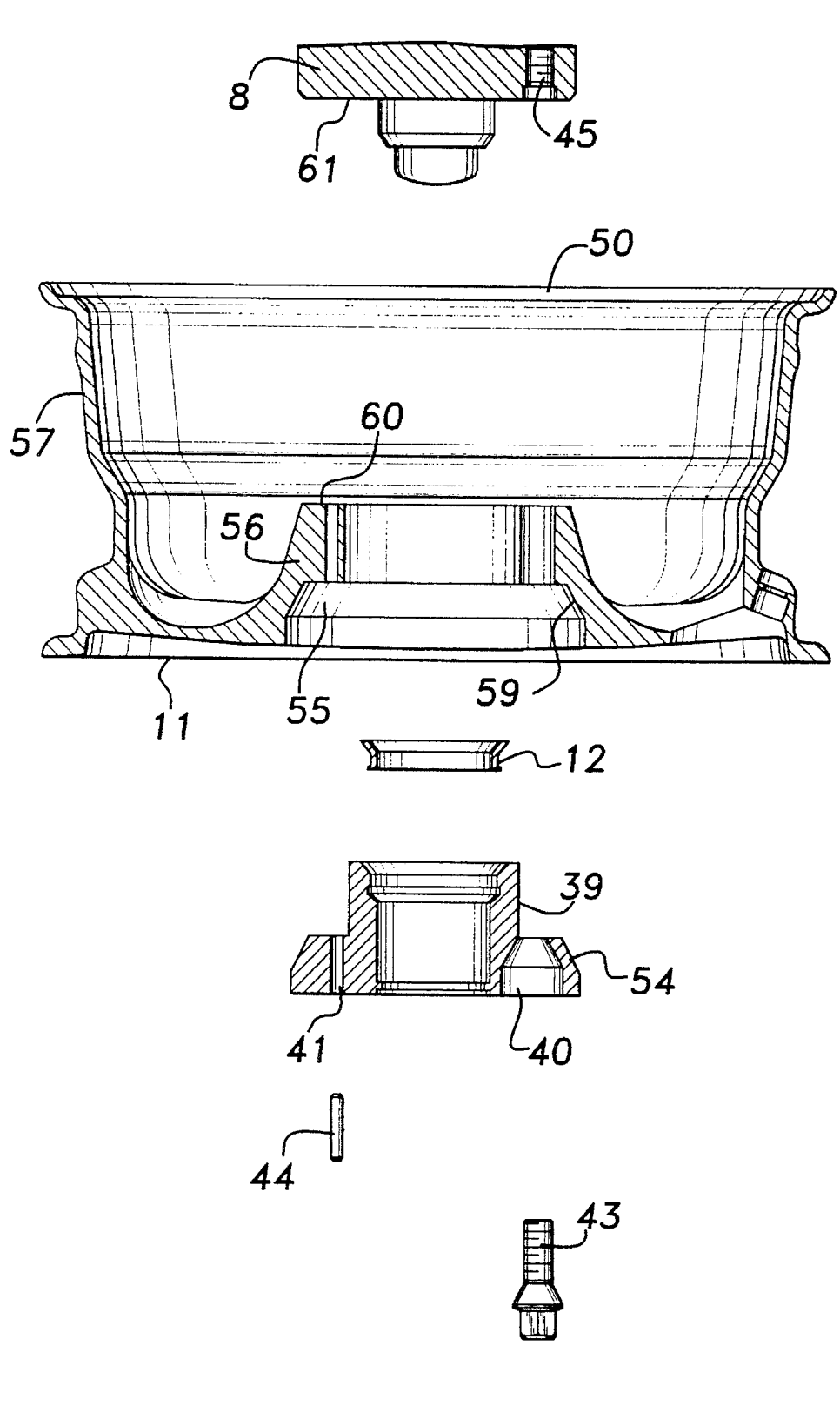

FIG. 47 discloses as an explosion view the mounting situation of such an adapter from the from side 11 of the rim as well as the attachment of the mounted hub adapter by means of wheel screws or wheel nuts in or at serial-screwing locations. The centering of the wheel takes place by means of centering rings at the axle centering collar of the vehicle. The screwing presses an angularly configured flange 54 at the front end of the hub adapter 39 against a correspondingly configured collar 59 within the rim opening resulting in the fact that the wheel is pressed with its backwards located supporting surface 60 against the brake disc or brake drum 8, respectively. By this pressure of the surface the torque is transferred. The hub adapter 39 itself should have a small distance of in general 0.5 mm from the supporting surface 61 (FIG. 47) as shown in FIG. 45, because it must not contact this supporting surface.

The advantage of the last mentioned constructional embodiment of the unitary wheel system is to be seen therein that the wheel and the hub adapter can be attached by means of the same connecting elements, so that they need no separate screwing. The disadvantageous, however, that because of the different positions of the screwing points at the different types of vehicles different adapters are necessary.

I claim:

1. A unitary wheel system for attaching to a vehicle hub, said wheel system comprising:

a wheel rim having a from side and a rear side, a plurality of blind holes being formed in said rear side at selected angular positions around a centric wheel rim bore, said blind holes each further including an elongated and slotted shape in cross section which extends radially outwardly from said centric wheel rim bore;

a hub adapter including a centric and externally threaded cylindrical part with a front end and an open rear end facing the vehicle hub and attaching means for mounting said hub adapter to the vehicle hub;

a central closing nut being positioned over said centric wheel rim bore at said front side of said wheel rim, said central closing nut having interior threads which interengage with said exterior threads of said hub adapter cylindrical part at said front end to mount said hub adapter to said wheel rim;

a plurality of centering elements extending from the vehicle hub and inserting through said outwardly slotted blind holes in said wheel rim to center said wheel rim along said outwardly slotted blind holes; and a distance ring member selected according to a uniform annular dimension and being positioned so as to occupy an otherwise open space between the vehicle hub and a central bore of said open end of said hub adapter upon mounting said hub adapter to the vehicle hub.

2. The unitary wheel system according to claim 1, said centering elements further comprising pluralities of centering screws and centering nuts.

3. The unitary wheel system according to claim 2, said rear side of said wheel rim being provided with four blind holes for receiving four centering screws and four centering nuts.

4. The unitary wheel system according to claim 2, said rear side of said wheel rim being provided with five blind holes for receiving five centering screws and five centering nuts.

5. The unitary wheel system according to claim 2, said rear side of said wheel rim being provided with a first combination of five blind holes in a first selected orientation and a second combination of four blind holes in a second offset and selected orientation, a selected plurality of four or five centering screws and centering nuts extending from the vehicle hub and said hub adapter for mounting said rim thereto.

6. The unitary wheel system according to claim 1, said cylindrical part of said hub adapter extending through said wheel rim further and comprising a hollow cylinder, said front end including an outer diameter corresponding generally to an inner diameter of said wheel rim centric bore to permit insertion of said hub adapter, said front end terminating in a conical tap onto which said central closing nut is threadably engaged, said open rear end expanding conically outwardly to enclose a grease cap of the vehicle hub.

7. The unitary wheel system according to claim 1, said attaching means further comprising a flange extending outwardly in an annular fashion from said open rear end of said cylindrical part and a plurality of apertures formed around a periphery of said flange corresponding in arrangement to said blind holes of said wheel rim and said centering elements extending from the vehicle hub.

\* \* \* \* \*